United States Patent
Kimura et al.

(10) Patent No.: US 10,104,091 B2
(45) Date of Patent: Oct. 16, 2018

(54) AUTHENTICATING APPARATUS, AUTHENTICATING SYSTEM AND STORAGE MEDIUM

(71) Applicant: FUJI XEROX CO., LTD., Tokyo (JP)

(72) Inventors: Tetsuya Kimura, Yokohama (JP); Kensuke Ito, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 219 days.

(21) Appl. No.: 15/145,113

(22) Filed: May 3, 2016

(65) Prior Publication Data

US 2016/0248784 A1    Aug. 25, 2016

Related U.S. Application Data

(63) Continuation of application No. PCT/JP2014/070350, filed on Aug. 1, 2014.

(30) Foreign Application Priority Data

Mar. 7, 2014 (JP) ................................ 2014-045363

(51) Int. Cl.
*H04W 12/06* (2009.01)
*H04L 29/06* (2006.01)
(Continued)

(52) U.S. Cl.
CPC ............ *H04L 63/107* (2013.01); *G06F 21/36* (2013.01); *G06K 9/2081* (2013.01);
(Continued)

(58) Field of Classification Search
CPC .......... G06F 21/30; G06F 21/31; G06F 21/36; G06K 9/20; G06K 9/2054; G06K 9/62; G06K 9/6201; G06K 9/6202
See application file for complete search history.

(56) References Cited

U.S. PATENT DOCUMENTS

2002/0136457 A1* 9/2002 Onishi ............... G06K 9/00154
382/209
2006/0131389 A1* 6/2006 Kwon .................... G07D 7/004
235/380
(Continued)

FOREIGN PATENT DOCUMENTS

CN        101030244 A        9/2007
JP        2004-265353 A      9/2004
(Continued)

OTHER PUBLICATIONS

Nov. 4, 2014 Search Report issued in International Patent Application No. PCT/JP2014/070350.
(Continued)

*Primary Examiner* — Khang Do
(74) *Attorney, Agent, or Firm* — Oliff PLC

(57) ABSTRACT

In authentication based on an image region read from a surface of a target object, authentication based on a position corresponding to the image region is executed. An authenticating server 2 receives an image region as an authentication target read from a surface of a target object possessed by a user together with an authentication request from the user, identifies a position corresponding to the image region as the authentication target and one reference image region corresponding to the image region as the authentication target in a plurality of previously stored reference image regions read from respective surfaces of a plurality of target objects, and executes authentication in response to the authentication request based on the identified position.

17 Claims, 15 Drawing Sheets

(51) Int. Cl.
*G06F 21/36* (2013.01)
*G06K 9/20* (2006.01)
*G06K 9/62* (2006.01)

(52) U.S. Cl.
CPC ........ *G06K 9/6202* (2013.01); *H04L 63/0853* (2013.01); *H04W 12/06* (2013.01)

(56) References Cited

U.S. PATENT DOCUMENTS

| | | | | |
|---|---|---|---|---|
| 2007/0115499 | A1* | 5/2007 | Kimura | G06K 19/14 358/1.15 |
| 2010/0302374 | A1* | 12/2010 | Ebara | G06Q 20/40 348/156 |
| 2011/0075179 | A1 | 3/2011 | Utsumi | |
| 2011/0199501 | A1* | 8/2011 | Hayashi | H04N 5/2355 348/222.1 |

FOREIGN PATENT DOCUMENTS

| | | |
|---|---|---|
| JP | 2007-277821 A | 10/2007 |
| JP | 4103826 B2 | 6/2008 |
| JP | 2008-217716 A | 9/2008 |
| JP | 2010-246082 A | 10/2010 |
| JP | 2010-277439 A | 12/2010 |
| JP | 2011-076216 A | 4/2011 |
| JP | 2011-253340 A | 12/2011 |

OTHER PUBLICATIONS

Nov. 4, 2014 Written Opinion issued in International Patent Application No. PCT/JP2014/070350.
Oct. 9, 2017 Extended Search Report issued in European Patent Application No. 14884797.3.
Feb. 23, 2018 Office Action issued in Chinese Patent Application No. 201480068043.1.

* cited by examiner

| USER ID | DETAILED INFORMATION |
|---------|----------------------|
| U0001   | USER A               |
| U0002   | USER B               |
| U0003   | USER C               |
|         |                      |

FIG. 6

| REFERENCE IMAGE ID | STORAGE DESTINATION OF REFERENCE IMAGE | USER ID |
|---|---|---|
| G0001 | file:///xx/REFERENCE IMAGE A.jpg | U0001 |
| G0002 | file:///xx/REFERENCE IMAGE B.jpg | U0002 |
| G0003 | file:///xx/REFERENCE IMAGE C.jpg | U0002 |
| G0004 | file:///xx/REFERENCE IMAGE D.jpg | U0003 |
| G0005 | file:///xx/REFERENCE IMAGE E.jpg | |
| | | |
| | | |

FIG. 7

| REFERENCE IMAGE ID | COMPARED REGION |
|---|---|
| G0001 | (X11, Y11) TO (X12, Y12) |
| G0001 | (X13, Y13) TO (X14, Y14) |
| G0001 | (X15, Y15) TO (X16, Y16) |
| G0002 | (X21, Y21) TO (X22, Y22) |
| G0002 | (X23, Y23) TO (X24, Y24) |
| G0003 | (X31, Y31) TO (X32, Y32) |
| G0004 | |
| G0005 | |
| | |

FIG. 8

| USER ID | REFERENCE IMAGE ID | VALIDITY DETERMINATION NUMBER | VALIDITY DETERMINATION NUMBER (THRESHOLD) | UPDATE DATE |
|---|---|---|---|---|
| U0001 | G0001 | 2 | 3 | yyyy/mm/dd hh:mm:ss |
| U0002 | G0002 | 1 | 3 | yyyy/mm/dd hh:mm:ss |
|  |  |  |  |  |
|  |  |  |  |  |

AUTHENTICATING APPARATUS, AUTHENTICATING SYSTEM AND STORAGE MEDIUM

CROSS REFERENCE TO RELATED APPLICATION

This is a continuation of International Application No. PCT/JP2014/070350 filed on Aug. 1, 2014, and claims priority from Japanese Patent Application No. 2014-045363, filed on Mar. 7, 2014.

TECHNICAL FIELD

The present invention relates to an authenticating apparatus, an authenticating system and a storage medium.

SUMMARY OF INVENTION

According to an aspect of the invention, there is provided an authenticating apparatus including a receiving unit that receives an image region as an authentication target read from a surface of a target object possessed by a user together with an authentication request from the user, an identifying unit that identifies a position corresponding to the image region as the authentication target and one reference image region corresponding to the image region as the authentication target in a plurality of previously stored reference image regions read from respective surfaces of a plurality of target objects, and an authenticating unit that executes authentication in response to the authentication request based on the identified position.

BRIEF DESCRIPTION OF DRAWINGS

FIG. 6 is a diagram illustrating an example of data storage in an associated information storage unit.

FIG. 7 is a diagram illustrating an example of data storage in a compared region storage unit.

FIG. 8 is a diagram illustrating an example of data storage in a validity determination number storage unit.

Figure 1:
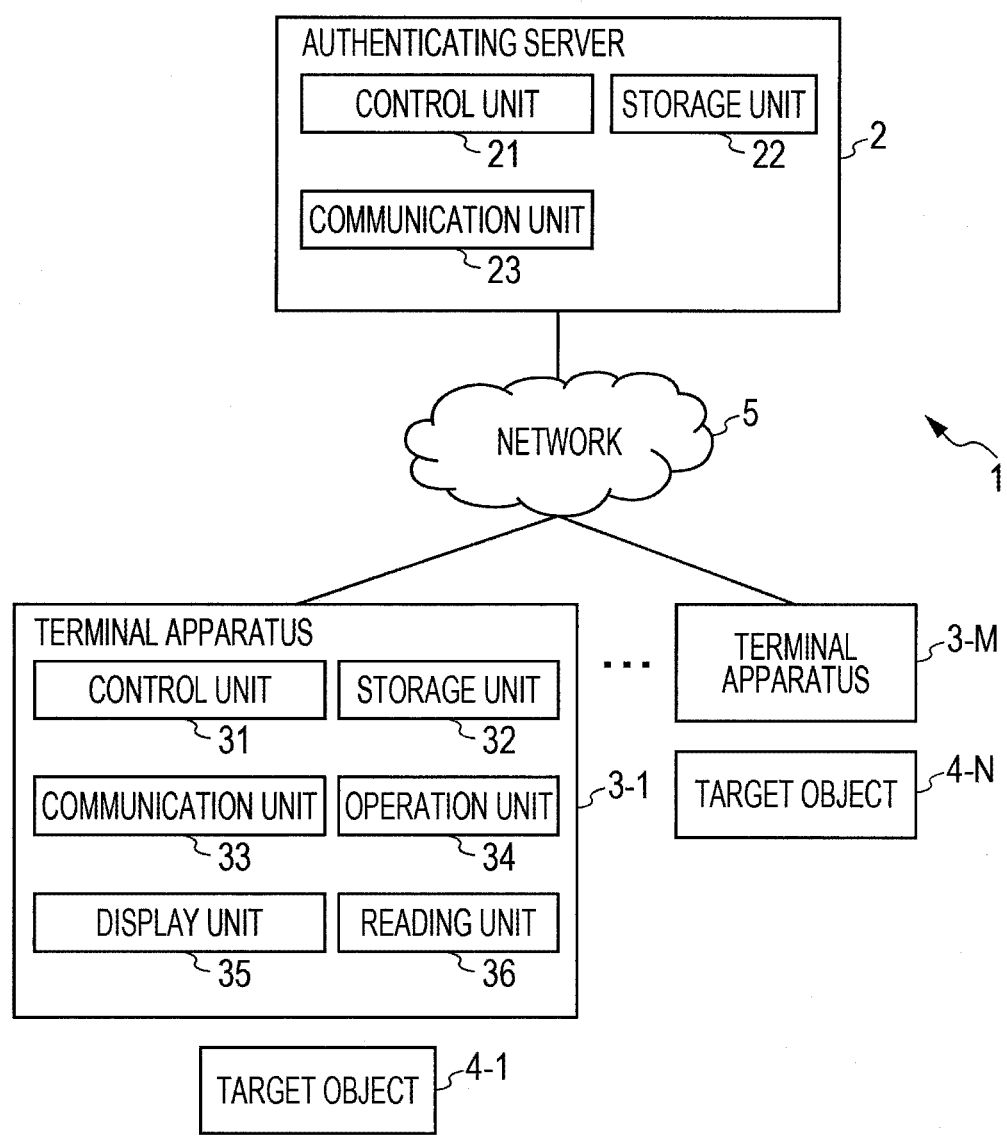
FIG. 1 is a diagram illustrating an example of the configuration of apparatuses in an authenticating system.

REFERENCE SIGNS LIST 1 authenticating system
2 authenticating server
3 terminal apparatus
4 target object
5 network
21 control unit
22 storage unit
23 communication unit
31 control unit
32 storage unit
33 communication unit
34 operation unit
34B operation button
34T touch panel
35 display unit
35D display
36 reading unit
36C camera
39 holder
210 authentication data receiving unit
220 authenticating unit
221 identification information checking unit
222 reference image acquiring unit
223 comparing unit
224 comparison position identifying unit
225 compared region determining unit
226 compared region recording unit
227 authentication data determining unit
230 registering unit
240 authentication result transmitting unit
250 reading position determining unit
260 reading position information transmitting unit
310 reading position receiving unit
320 read image acquiring unit
330 read image processing unit
340 identification information acquiring unit
350 authentication data transmitting unit
360 authentication result receiving unit
370 authentication result output unit
380 reading position information receiving unit
390 reading position guiding unit
401 read image region
402 reference image region
403 comparison position
404 compared region
405 next reading position
510 reading position storage unit
610 identification information storage unit
620 reference image storage unit
630 associated information storage unit
640 compared region storage unit
650 validity determination number storage unit

DESCRIPTION OF EMBODIMENTS

Examples of embodiments for implementing the present invention (hereinafter referred to as embodiments) will be described below based on the drawings. In the drawings of the present specification, elements similar to those previously illustrated in earlier drawings may be designated by the same reference signs, with detailed description thereof omitted as appropriate.

1. First Embodiment

In the following, an authenticating system according to a first embodiment of the present invention will be described.

[1-1. System Configuration]

FIG. 1 is a diagram illustrating an example of the configuration of apparatuses in an authenticating system 1 according to the first embodiment. As illustrated in the drawing, the authenticating system 1 includes a authenticating server 2 configured by a server computer or the like, terminal apparatuses 3-1 to 3-M (M represents an integer equal to or greater than 1) operated by one or more users (hereinafter also simply referred to as the terminal apparatuses 3), and target objects 4-1 to 4-N (N represents an integer equal to or greater than 1) that are objects respectively possessed by the one or more users (hereinafter also simply referred to as the target objects 4). Herein, the terminal apparatus 3 may be, for example, a mobile phone such as a smartphone, a tablet terminal, a personal computer, or a PDA (Personal Digital Assistant).

Further, the target object 4 is an object exhibiting a unique feature on a surface thereof. The target object 4 is a card made of a paper material or a plastic substrate, for example. The unique feature corresponds to a unique pattern appearing on the surface of the target object 4 due to patterns and so forth formed by fiber, minute cracks, and minute particles or the like of a material forming the target object 4. The shape of the fiber, cracks, patterns, and so forth appearing on the surface of the target object 4 varies between the individual target objects 4 and between positions on the surface of each target object 4. The pattern on the surface of the target object 4, therefore, serves as unique information for each of the target objects 4 and in accordance with the position of the pattern on the surface of the same target object 4.

Further, the authenticating server 2 and the terminal apparatuses 3 are connected via a network 5 capable of data communication such as a computer communication network, and the apparatuses are capable of transmitting and receiving data to and from each other even if installed at remote locations.

In the present embodiment, the terminal apparatus 3 optically reads the target object 4 possessed by the user, and transmits the read image to the authenticating server 2 together with an authentication request from the user. The authenticating server 2 compares the image transmitted from the terminal apparatus 3 with a plurality of images previously read from a respective plurality of target objects 4 to thereby determine authentication success or authentication failure in response to the authentication request received together with the image, and transmits an authentication result to the terminal apparatus 3. In this case, the authenticating server 2 previously stores the information of images transmitted from the same terminal apparatus 3 or a different terminal apparatus 3 and compared images (regions) compared in the past, and determines authentication failure in response to the authentication request received from the terminal apparatus 3, if the image received from the terminal apparatus 3 together with the authentication request corresponds to any of the compared images (regions). For example, the terminal apparatus 3 may receive a service from the authenticating server 2 if having received from the authenticating server 2 an authentication result indicating authentication success, and may output an authentication error if having received from the authenticating server 2 an authentication result indicating authentication failure.

[1-2. Hardware Configuration]

An example of the hardware configuration of each of the authenticating server 2 and the terminal apparatus 3 will now be described based on FIG. 1.

[1-2-1. Hardware Configuration of Authenticating Server]

The hardware configuration of the authenticating server will first be described. As illustrated in FIG. 1, the authenticating server 2 includes, as the hardware configuration, a control unit 21, a storage unit 22, and a communication unit 23.

The control unit 21 is configured to include a microprocessor, for example. The control unit 21 operates in accordance with an operating system and programs stored in the storage unit 22 to execute a variety of arithmetic processes and control the respective units of the authenticating server 2.

The storage unit 22 is configured by a memory device such as a RAM or a flash memory, for example, a hard disk drive, and so forth. The storage unit 22 stores programs, data, input information, arithmetic results, and so forth.

The communication unit 23 performs wired or wireless data communication. For example, the communication unit 23 is configured by a communication integrated circuit for a wired LAN, a connector, and so forth if intended to perform wired data communication, and is configured by an integrated circuit for a wireless LAN, an antenna, and so forth if intended to perform wireless data communication. The communication unit 23 realizes data transmission and reception to and from another apparatus via a network capable of data communication such as a computer communication network.

[1-2-2. Hardware Configuration of Terminal Apparatus]

The hardware configuration of the terminal apparatus will now be described. As illustrated in FIG. 1, the terminal apparatus 3 includes, as the hardware configuration, a control unit 31, a storage unit 32, a communication unit 33, an operation unit 34, a display unit 35, and a reading unit 36.

The control unit 31 is configured to include a microprocessor, for example. The control unit 31 operates in accordance with an operating system and programs stored in the storage unit 32 to control the respective units of the terminal apparatus 3.

The storage unit 32 is configured by a memory device such as a RAM or a flash memory, for example, a hard disk drive, and so forth. The storage unit 32 stores programs, data, input information, arithmetic results, and so forth.

The communication unit 33 performs wired or wireless data communication. For example, the communication unit 33 is configured by a communication integrated circuit for a wired LAN, a connector, and so forth if intended to perform wired data communication, and is configured by an integrated circuit for a wireless LAN, an antenna, and so forth if intended to perform wireless data communication. The communication unit 33 realizes data transmission and reception to and from another apparatus via a network capable of data communication such as a computer communication network or mobile phone network.

The operation unit 34 is configured by input devices such as buttons, a touch panel, a mouse, and a keyboard, for example, including buttons provided on a surface of the terminal apparatus 3 and a touch panel provided to be superimposed on a display.

The display unit 35 is a liquid crystal display or an organic EL display, for example, including a display provided on a front surface of the terminal apparatus 3. The display unit 35 displays a screen in accordance with an instruction from the control unit 31.

The reading unit 36 reads the surface of the target object 4 possessed by the user. The reading unit 36, which is a camera or a scanner, for example, optically reads the surface of the target object 4 in accordance with an instruction from the control unit 31.

Figure 2:
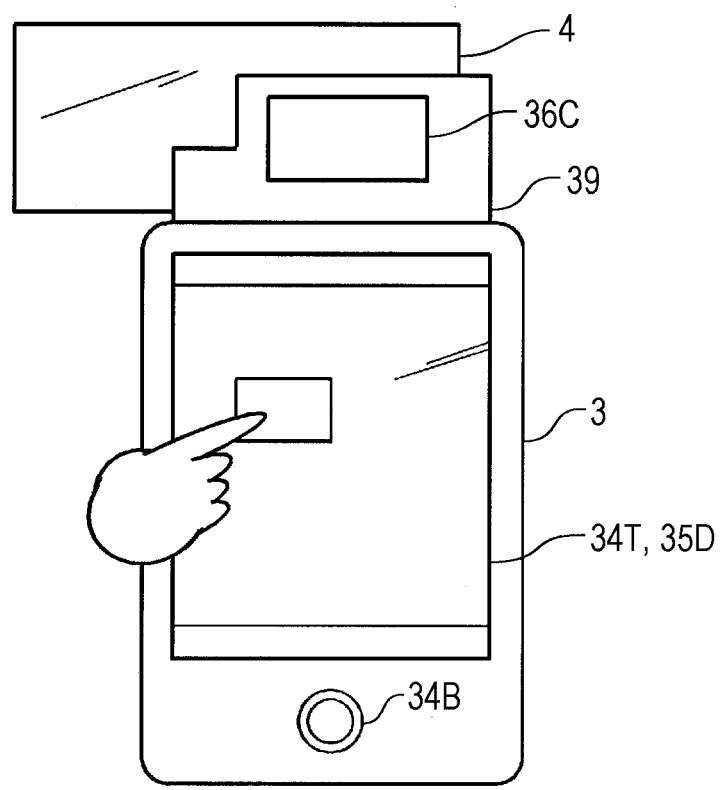
FIG. 2 is a diagram illustrating an example of the external view of a terminal apparatus.

FIG. 2 is a diagram illustrating an example of the terminal apparatus 3 according to the present embodiment. As illustrated in FIG. 2, the terminal apparatus 3 may include an operation button 34B and a touch panel 34T functioning as the operation unit 34, a display 35D functioning as the display unit 35, a camera 36C functioning as the reading unit 36, and a holder 39 for holding the target object 4. Herein, the touch panel 34T provided to be superimposed on the display 35D detects a position touched by the user. Further, the camera 36C images the surface of the target object 4 held by the holder 39.

As illustrated in FIG. 2, the display 35D displays an image of the surface of the target object 4 imaged by the camera 36C. For example, the terminal apparatus 3 determines a reading region in a surface image showing the surface of the target object 4 displayed on the display 35D based on a position specified by the user or the authenticating server 2, clips the image of the determined reading region, and transmits the image to the authenticating server 2.

[1-3. Functional Blocks]

Figure 3:
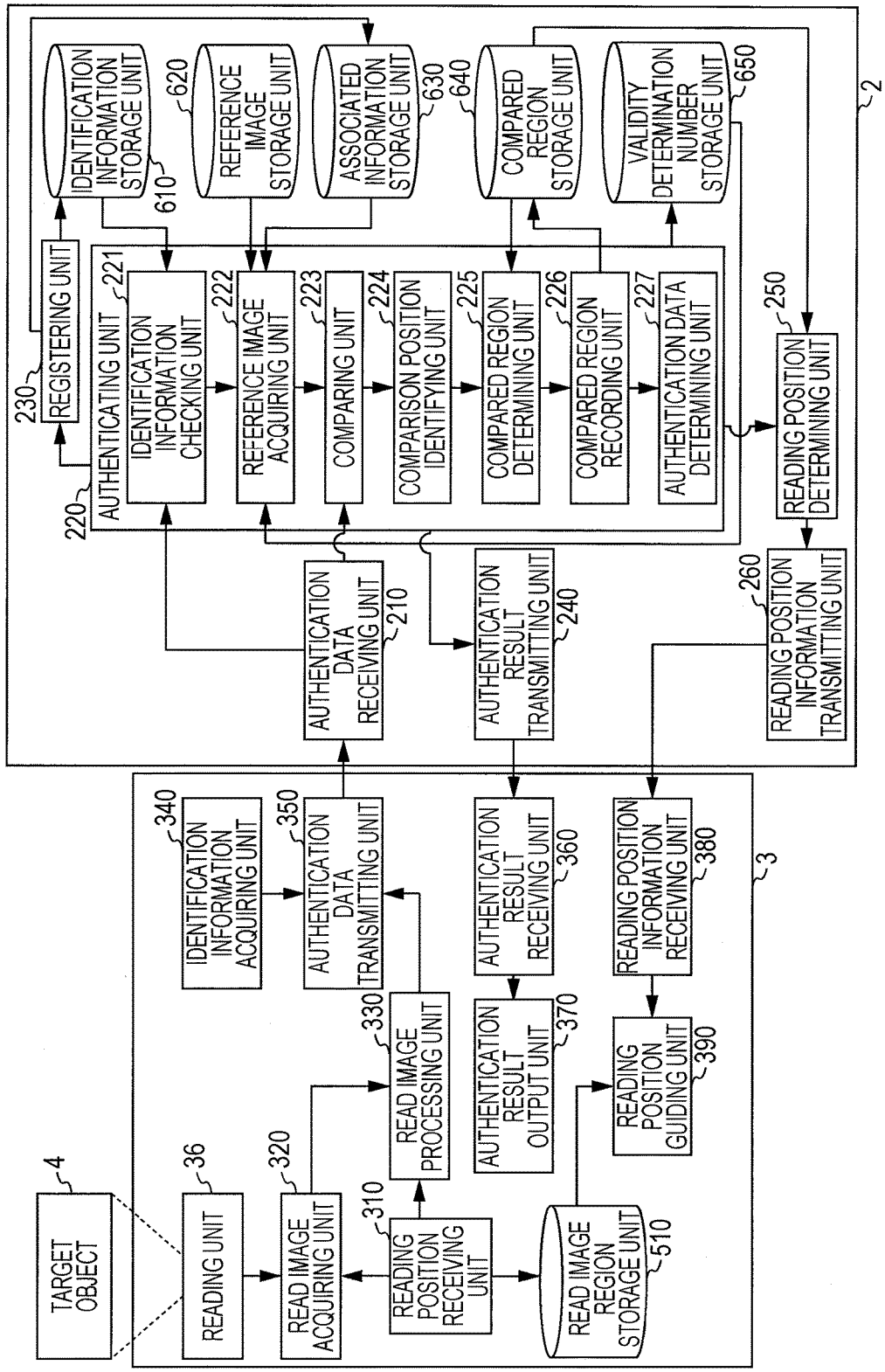
FIG. 3 is a functional block diagram illustrating an example of the functional configuration of the authenticating system.

Based on the functional block diagram in FIG. 3 illustrating an example of the functional configuration of the authenticating system 1, an example of functions provided to the terminal apparatus and the authenticating server will now be described.

[1-3-1. Functional Blocks of Terminal Apparatus]

An example of functions provided to the terminal apparatus will first be described. As illustrated in FIG. 3, the terminal apparatus 3 includes, in a functional sense, a reading position receiving unit 310, a read image acquiring unit 320, a read image processing unit 330, an identification information acquiring unit 340, an authentication data transmitting unit 350, an authentication result receiving unit 360, an authentication result output unit 370, a reading position information receiving unit 380, a reading position guiding unit 390, and a reading position storage unit 510. These functions are realized as the control unit 31 executes a program stored in the storage unit 32. The above-described program is supplied to the terminal apparatus 3 via a computer-readable information storage medium such as an optical disk, a magnetic disk, or a flash memory, for example, or via communication means such as a computer communication network or a mobile phone network. Details of the functions of the respective units included in the terminal apparatus 3 will be described below.

The reading position receiving unit 310 receives via the operation unit 34 a reading position on the surface of the target object 4 possessed by the user from the user who uses the terminal apparatus 3. Herein, the reading position of the target object 4 refers to a position as a reference for clipping a region of a predetermined image size (hereinafter also referred to as the read image region) from the region of the surface of the target object 4. The reading position receiving unit 310 further stores the information of the above-described read image region in the later-described reading position storage unit 510.

The read image region herein is an image region in the region of the surface of the target object 4 to be subjected to authentication by the authenticating system 1. The read image region may be a region of a predetermined image size centering on the reading position, or may be a region including the reading position received by the reading position receiving unit 310 in a plurality of divided regions of the entire region of the surface of the target object 4.

It is assumed in the present embodiment that the reading position receiving unit 310 causes the display 35D (see FIG. 2) of the terminal apparatus 3 to display a schematic diagram or the like illustrating the region of the surface of the target object 4, and receives the reading position of the target object 4 held by the holder 39 based on the position on the touch panel 34T touched by the user.

The reading position storage unit 510 stores the information of the read image region determined based on the reading position received by the reading position receiving unit 310. The reading position storage unit 510 may store, for example, position coordinates representing the read image region.

It is assumed in the present embodiment that the read image region is a rectangular region, and that the reading position storage unit 510 stores the position coordinates corresponding to the upper-left apex of the read image region.

The read image acquiring unit 320 acquires an image of the surface of the target object 4 read by the reading unit 36 (hereinafter also referred to as the read image). Herein, the reading unit 36 may read the read image region with reference to the reading position received by the reading position receiving unit 310, or may read the entire surface of the target object 4 or a region of a predetermined image size including the read image region.

The read image processing unit 330 performs image processing on the read image acquired by the read image acquiring unit 320. The image processing herein includes, for example, change of the resolution, color tone correction, and denoising. The image processing may be specified by the user, or may be predetermined, for example. Further, if the image size of the read image is greater than the predetermined image size of the read image region, the read image processing unit 330 performs a trimming process such that the read image has the image size of the read image region.

The identification information acquiring unit 340 acquires identification information for identifying the user who uses the authenticating system 1, the terminal apparatus 3 used by the user, or the like. The identification information acquiring unit 340 may acquire the identification information from the information previously stored in the storage unit 32, or may acquire the identification information input by the user via the operation unit 34. In the present embodiment, the identification information acquiring unit 340 acquires a user ID for uniquely identifying the user as the identification information. However, the identification information is not limited thereto, and an apparatus ID for identifying the terminal apparatus 3 or a device ID for identifying a device included in the terminal apparatus 3 such as a camera may be acquired.

The authentication data transmitting unit 350 transmits, together with the authentication request from the user, the read image region as an authentication target of the predetermined image size read by the reading unit 36. In the present embodiment, the authentication data transmitting unit 350 transmits to the authenticating server 2 authentication data that is data including the read image corresponding to the image of the read image region as the authentication target acquired by the read image acquiring unit 320 and image-processed by the read image processing unit 330 and the user ID acquired by the identification information acquiring unit 340.

The authentication result receiving unit 360 receives the authentication result transmitted by a later-described authentication result transmitting unit 240. Specifically, the authentication result receiving unit 360 waits for the authentication result transmitted from the authenticating server 2, and acquires the authentication result.

The authentication result output unit 370 outputs the contents of the authentication result received by the authentication result receiving unit 360. The authentication result output unit 370 outputs, for example, the authentication result in response to the transmitted authentication data, to thereby notify the user as the authentication target of the authentication result.

The reading position information receiving unit 380 receives reading position information transmitted by a later-described reading position information transmitting unit 260. Specifically, the reading position information receiving unit 380 waits for the reading position information transmitted from the authenticating server 2, and acquires the reading position information.

The reading position guiding unit 390 guides the user to the reading position on the surface of the target object 4 possessed by the user based on the reading position information received by the reading position information receiving unit 380. For example, the reading position guiding unit 390 may provide guidance to the reading position by causing the display unit 35 to display a display screen showing the reading position to be read this time.

The reading position guiding unit 390 may guide the user to the reading position determined based on the information of the last read image region stored in the reading position storage unit 510 and the reading position information received by the reading position information receiving unit 380.

[1-3-2. Functional Blocks of Authenticating Server]

An example of functions provided to the authenticating server will now be described. As illustrated in FIG. 3, the authenticating server 2 includes, in a functional sense, an authentication data receiving unit 210, an authenticating unit 220, a registering unit 230, an authentication result transmitting unit 240, a reading position determining unit 250, a reading position information transmitting unit 260, an identification information storage unit 610, a reference image storage unit 620, an associated information storage unit 630, a compared region storage unit 640, and a validity determination number storage unit 650. These functions are realized as the control unit 21 executes a program stored in the storage unit 22. The above-described program is supplied to the authenticating server 2 via a computer-readable information storage medium such as an optical disk, a magnetic disk, or a flash memory, for example, or via communication means such as a computer communication network. Details of the functions of the respective units included in the authenticating server 2 will be described below.

The authentication data receiving unit 210 receives the read image region as the authentication target of the predetermined image size read from the surface of the target object 4 possessed by the user together with the authentication request from the user. In the present embodiment, the authentication data receiving unit 210 waits for the authentication data corresponding to the authentication request from the user, and acquires the read image as the authentication target included in the authentication data.

The identification information storage unit 610 stores identification information that is subjected to authentication by the authenticating unit 220.

Figures 4, 5:
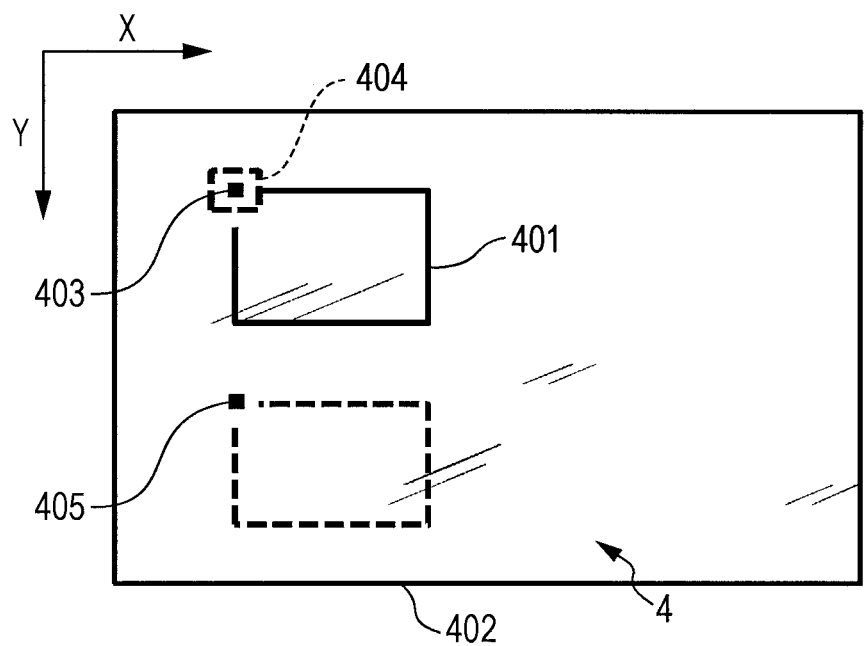
FIG. 4 is a diagram illustrating an example of data storage in an identification information storage unit.
FIG. 5 is a diagram illustrating the relationship in position and image size between a read image region, a reference image region, a comparison position, a compared region, and a reading position.

FIG. 4 is a diagram illustrating an example of data storage in the identification information storage unit 610. As illustrated in the drawing, the identification information storage unit 610 stores, for example, user IDs for identifying a respective plurality of users and detailed information concerning the respective users (user names, for example).

The reference image storage unit 620 stores a plurality of regions read from the respective surfaces of the plurality of target objects 4 (hereinafter also referred to as the reference image regions). Specifically, the reference image storage unit 620 stores a plurality of reference images corresponding to images in the reference image regions read from the respective surfaces of the plurality of target objects 4. In the present embodiment, description will be given of a case in which the image size of the reference image region is greater than the predetermined image size of the read image region. The reference image region may represent the entire surface of the target object 4.

The reference image storage unit 620 is assumed to store one reference image for one target object 4 in the present embodiment, but may store a plurality of reference images for one target object 4. The respective plurality of target objects 4 are distributed to the respective plurality of users using the authenticating system 1 after the reference images read from the surfaces have been registered in the reference image storage unit 620. Further, if the users (or the devices of the users) as the distribution destinations of the target objects 4 are identified at the time of distribution, the reference images of the target objects 4 and the identification information of the users (or the devices of the users) as the distribution destinations may be stored in association with each other.

FIG. 5 is a diagram illustrating the relationship in position and image size between a read image region 401, a reference image region 402, a comparison position 403, a compared region 404, and a next reading position 405. Herein, each of the read image region 401 and the reference image region 402 is a region showing the surface of the target object 4. As illustrated in the drawing, the read image region 401 is set inside the reference image region 402. The respective image sizes of the reference image regions 402 read from the respective plurality of target objects 4 may be the same size, and the image sizes of the read image regions 401 may also be uniform. The comparison position 403, the compared region 404, and the next reading position 405 will be described later.

The associated information storage unit 630 stores reference image identification information for identifying the reference images stored in the reference image storage unit 620 in association with the identification information stored in the identification information storage unit 610.

FIG. 6 is a diagram illustrating an example of data storage in the associated information storage unit 630. As illustrated in the drawing, at least parts of the plurality of reference image regions are registered as linked to the respective user IDs in the associated information storage unit 630. Specifically, the associated information storage unit 630 stores a plurality of reference image IDs, and each of the reference image IDs is associated with the storage destination of the reference image, such as a file path, for example, and zero or one user ID.

The compared region storage unit 640 stores a compared region in the reference image region of each of the reference images stored in the reference image storage unit 620, which includes a position corresponding to the read image region included in the authentication data received by the authentication data receiving unit 210.

As illustrated in FIG. 5, the compared region 404 is a region including the comparison position 403, which is a position representing a portion of the reference image region 402 corresponding to the read image region 401. It is assumed in the present embodiment that the comparison position 403 is the position of the upper-left apex of a local region corresponding to the read image region 401. It is also assumed that the compared region 404 is a region of a predetermined image size centering on the comparison position 403 (a region formed of the a×b (a≥1) (b≥1) number of dots (pixels), for example).

FIG. 7 is a diagram illustrating an example of data storage in the compared region storage unit 640. As illustrated in the drawing, the compared region storage unit 640 stores the information of zero or at least one compared region for one reference image ID. In the present embodiment, the compared region storage unit 640 stores, as the information of the compared region, the position coordinates corresponding to the upper-left apex and the position coordinates corresponding to the lower-right apex.

The validity determination number storage unit 650 stores the number of times by which the received authentication data has been determined to be valid authentication data by a later-described authentication data determining unit 227.

FIG. 8 is a diagram illustrating an example of data storage in the validity determination number storage unit 650. As illustrated in the drawing, the validity determination number storage unit 650 stores a validity determination number, which represents the number of times by which the authentication data has been determined to be valid, in association with the user ID included in the authentication data and the reference image ID corresponding to the read image. The validity determination number storage unit 650 may further store a threshold of the validity determination number before authentication success is determined and an update date on which the validity determination number was updated in association with the validity determination number.

Based on the authentication data received by the authentication data receiving unit 210 and various data stored in the identification information storage unit 610, the reference image storage unit 620, the associated information storage unit 630, the compared region storage unit 640, and the validity determination number storage unit 650, the authenticating unit 220 determines authentication success or authentication failure in response to the received authentication data, or requests further authentication data from the same user.

Further, the authenticating unit 220 includes an identification information checking unit 221, a reference image acquiring unit 222, a comparing unit 223, a comparison position identifying unit 224, a compared region determining unit 225, a compared region recording unit 226, and an authentication data determining unit 227. The respective units included in the authenticating unit 220 will be described below.

The identification information checking unit 221 checks if the identification information included in the received authentication data is present in the plurality of identification information items stored in the identification information storage unit 610. For example, if the user IDs illustrated in FIG. 4 are stored in the identification information storage unit 610, and if the authentication data receiving unit 210 has received authentication data including user ID "U0001," the identification information checking unit 221 refers to the identification information storage unit 610, and checks the presence of user ID "U0001."

If the user ID included in the authentication data is absent in the identification information storage unit 610 (if the user ID in the received authentication data is "U0004," for example), the authenticating unit 220 may determine authentication failure in response to the received authentication data, or may determine authentication success or not based on the reference image included in the authentication data after the later-described registering unit 230 has registered the user ID in the identification information storage unit 610.

The reference image acquiring unit 222 acquires a reference image to be compared with the read image of the received authentication data from the plurality of reference images stored in the reference image storage unit 620.

In the present embodiment, if the received authentication data includes a user ID, the reference image acquiring unit 222 selects a reference image ID associated with the user ID from what is stored in the associated information storage unit 630, and acquires the corresponding reference image from the storage destination (a file path, for example) indicated by the reference image ID. For example, if the reference image IDs illustrated in FIG. 6 are stored, and if the authentication data includes user ID "U0001," the reference image acquiring unit 222 selects reference image ID "G0001" associated with user ID "U0001," and acquires "reference image A." If the user ID is "U0002," the reference image acquiring unit 222 acquires one of "reference image B" and "reference image C." Further, if the received authentication data does not include a user ID, the reference image acquiring unit 222 may acquire the reference images related to all reference image IDs stored in the associated information storage unit 630.

Further, if the validity determination number associated with the user ID included in the authentication data is stored in the validity determination number storage unit 650, the reference image acquiring unit 222 selects the reference image ID associated with the user ID, and acquires the reference image indicated by the reference image ID. For example, if the validity determination numbers illustrated in FIG. 8 are stored, and if the authentication data includes user ID "U0002," the reference image acquiring unit 222 selects reference image ID "G0002" and acquires "reference image B."

The comparing unit 223 compares a reference region being the region of the reference image acquired by the reference image acquiring unit 222 with the read image region as the authentication target being the region of the read image included in the received authentication data, to thereby determine whether or not a local region of the above-described reference region having the same image size as that of the read image and the above-described read image region as the authentication target are similar.

In the present embodiment, as described in Japanese Patent No. 4103826, the comparing unit 223 repeats a process of extracting, from the reference image region being the region of the reference image, a local region having the same image size as that of the read image region being the region of the read image, and calculating a correlation value representing the degree of similarity of an image feature (a lightness value, for example) between the local region and the read image region, while shifting the position of the local region on the reference image region in the X direction and the Y direction by the S (S represents an integer equal to or greater than 1, which is 1 in this case) number of dots at a time. By so doing, the (A2−A1+1)×(B2−B1+1) number of correlation values are obtained in one comparison process, when the number of dots in the read image region and the number of dots in the reference region are represented as A1×B1 and A2×B2 (A1<A2, B1<B2), respectively.

The comparing unit 223 determines whether the maximum value of the above-calculated plurality of correlation values lies between a first threshold serving as a criterion for similarity and a second threshold serving as a criterion for match. If the maximum value lies between the above-described thresholds, the comparing unit 223 determines that the local region in the reference image region and the read image region as the authentication target are similar. Further, the comparing unit 223 determines that the local region in the reference image region and the read image region match if the above-described maximum value of the correlation values is equal to or greater than the second threshold, and determines that the local region in the reference image region and the read image region are dissimilar in any other case (that is, a case in which the maximum value of the correlation values falls below the first threshold).

The comparison position identifying unit 224 identifies a position in one reference image region corresponding to the read image region as the authentication target in the previously stored plurality of reference image regions read from the respective surfaces of the plurality of target objects 4. The comparison position identifying unit 224 identifies, as a comparison position, a position in the region of the reference image corresponding to the read image of the received authentication data.

More specifically, if the maximum value of the correlation values between the local regions set for each of the plurality of reference image regions and having the same image size as that of the read image region and the read image region as the authentication target is equal to or greater than the first threshold serving as the criterion for similarity and less than the second threshold serving as the criterion for match, the comparison position identifying unit 224 identifies a position in the local region corresponding to the maximum value as the comparison position. Herein, the correlation values are calculated in the course of the comparison process by the comparing unit 223, and the comparison position identifying unit 224 identifies a position in the local region at which the correlation value is maximized as the comparison position. In the present embodiment, a coordinate position in a coordinate system of the reference image region corresponding to the upper-left apex of a rectangle representing the above-described local region is identified as the comparison position.

If the maximum value of the correlation values between the local regions set for each of the plurality of reference image regions and having the same image size as that of the read image region and the read image region as the authentication target is less than the first threshold serving as the criterion for similarity or equal to or greater than the second threshold serving as the criterion for match, the comparison position identifying unit 224 does not identify the comparison position. Further, if the comparison position in the reference image region has thus failed to be identified by the comparison position identifying unit 224, the authenticating unit 220 determines authentication failure in response to the received authentication request.

The compared region determining unit 225 determines whether or not the comparison position identified by the comparison position identifying unit 224 is included in a compared region stored in the compared region storage unit 640 for one reference image region corresponding to the read image region as the authentication target. The compared region determining unit 225 determines whether or not the position in the reference image region corresponding to the read image region of the received authentication data (that is, the comparison position identified by the comparison position identifying unit 224) is included in a region in the reference image region including the position corresponding to the read image region of authentication data received in the past (that is, the compared region stored in the compared region storage unit 640).

For example, if a position in the region of "reference image A" has been identified as the comparison position by the comparison position identifying unit 224, the compared region determining unit 225 determines whether or not the above-identified comparison position is included in any of compared regions ((X11, Y11) to (X12, Y12), (X13, Y13) to (X14, Y14), and (X15, Y15) to (X16, Y16)) associated with the corresponding reference image ID "G0001" in the compared regions illustrated in FIG. 7.

The compared region recording unit 226 records the region including the comparison position identified by the comparison position identifying unit 224 in the compared region storage unit 640 as the compared region. Specifically, if the compared region determining unit 225 has determined that the position in the reference image region corresponding to the received read image region (that is, the comparison position) is not included in any compared region, the compared region recording unit 226 determines a region including the comparison position identified by the comparison position identifying unit 224 and having a predetermined image size (a region formed of the a×b number of dots centering on the comparison position, for example) as a compared region, and records the region in the compared region storage unit 640 in association with the reference image ID for identifying the corresponding reference image.

The authentication data determining unit 227 determines whether or not the received authentication request is valid. For example, the authentication data determining unit 227 determines that the authentication request is valid if a first condition and a second condition given below are both satisfied, and determines that the authentication request is not valid if one of the first condition and the second condition is not satisfied.

The first condition is that the identification information linked to one reference image region corresponding to the read image region as the authentication target matches the identification information included in the received authentication information. That is, the authentication data determining unit 227 determines whether or not the reference image indicated by the reference image ID linked to the user ID included in the received authentication data corresponds to the read image included in the received authentication data, and determines that the first condition is satisfied if the reference image corresponds to the read image (that is, if the read image region is similar to a portion of the reference image region).

The second condition is that the comparison position identified by the comparison position identifying unit 224 is not included in any compared region stored in the compared region storage unit 640 for one reference image region corresponding to the read image region as the authentication target. That is, if the compared region determining unit 225 has determined that the identified comparison position is not included in any compared region, the authentication data determining unit 227 determines that the second condition is satisfied. If it has been determined that the identified comparison position is included in a compared region, the authentication data determining unit 227 determines the received authentication data to be compared authentication data.

Further, if the authentication data does not include identification information such as the user ID, or if no identification information is associated with the reference image corresponding to the read image included in the authentication data, the authentication data determining unit 227 may determine that the authentication request is valid if the second condition is satisfied, irrespective of whether or not the first condition is satisfied, and may determine that the authentication request is not valid if the second condition is not satisfied.

In the present embodiment, if the authentication request received from the same user by the authentication data receiving unit 210 has been determined to be valid a predetermined number of times by the authentication data determining unit 227, the authenticating unit 220 determines authentication success in response to the authentication request received from the user. Specifically, if the authentication data determining unit 227 has determined that the received authentication data is valid, the authenticating unit 220 acquires the validity determination number stored in the validity determination number storage unit 650 in association with the user ID and the reference image ID related to the authentication, and updates the validity determination number by adding "1" thereto. If the updated validity determination number has reached a predetermined number, the authenticating unit 220 determines authentication success in response to the received authentication data.

For example, if the validity determination numbers illustrated in FIG. 8 have already been stored, the received authentication data includes user ID "U0001," reference image ID "G0001" has been selected, and the received authentication data has been determined to be valid authentication data, the authenticating unit 220 adds 1 to validity determination number "2" associated with user ID "U0001" and reference image ID "G0001." If the validity determination number has reached threshold "3" of the validity determination number as a result of the addition, the authenticating unit 220 determines authentication success in response to the received authentication data. Further, for example, if the user ID is "U0003" and the reference image ID is "G0004" under a similar condition, the authenticating unit 220 sets the validity determination number to "1" and adds the validity determination number to the validity determination number storage unit 650 in association with user ID "U0003" and reference image ID "G0004." The authenticating unit 220 may update the validity determination number by setting the current date in the update date.

When determining authentication success in response to the received authentication data, the authenticating unit 220 initializes the validity determination number stored in the validity determination number storage unit 650. For example, when determining authentication success in response to the authentication data including user ID "U0001," the authenticating unit 220 initializes the validity determination number by deleting the validity determination number associated with the user ID or by setting the validity determination number to "0."

The authenticating unit 220 may also initialize the validity determination number when determining authentication failure in response to the authentication data. Further, the validity determination number may be initialized when a predetermined period has elapsed from the update date associated with the validity determination number.

If one reference image region corresponding to the image region as the authentication target is not linked to any identification information, the registering unit 230 registers the received identification information to be linked to the reference image region. For example, if the read image included in the received authentication data corresponds to the reference image indicated by a reference image ID stored in the associated information storage unit 630, and if no user ID is associated with the reference image ID, the registering unit 230 registers the user ID included in the received authentication data in the associated information storage unit 630 in association with the reference image ID.

Further, if the identification information included in the received authentication data is not stored in the identification information storage unit 610, the registering unit 230 may register the user ID in the identification information storage unit 610. Further, the registering unit 230 may not register the user ID based on the result of determination by the authentication data determining unit 227.

The authentication result transmitting unit 240 transmits the result of authentication by the authenticating unit 220 to the terminal apparatus 3. Specifically, the authentication result transmitting unit 240 transmits to the terminal apparatus 3 the authentication result in response to the authentication data transmitted from the terminal apparatus 3.

The reading position determining unit 250 determines the reading position of the read image region to be read from the target object 4 possessed by the user. More specifically, in one reference image region corresponding to the read image region as the authentication target excluding any compared region stored in the compared region storage unit 640, the reading position determining unit 250 determines the reading position of the read image region to be read next time.

As illustrated in FIG. 5, the reading position to be read next time from the target object 4, that is, the next reading position 405 is determined in positions not included in the compared region 404. It is assumed in the present embodiment that the position corresponding to the upper-left apex of the read image region to be read next time is determined as the next reading position 405.

Further, in the present embodiment, if the authentication data determining unit 227 has determined the received authentication data to be valid, the reading position determining unit 250 determines the reading position of the image region to be read next time. If any compared region stored in the compared region storage unit 640 for one reference image region corresponding to the read image region as the authentication target includes the comparison position identified by the comparison position identifying unit 224, the reading position determining unit 250 may determine the reading position of the image region to be read next time.

The reading position information transmitting unit 260 transmits to the terminal apparatus 3 the reading position information representing the reading position determined by the reading position determining unit 250. It is assumed in the present embodiment that the information representing the above-described reading position corresponds to a relative position ($\Delta X$, $\Delta Y$) from the comparison position identified in the reference image region by the comparison position identifying unit 224 to the position coordinates representing the above-determined reading position. In this case, the reading position guiding unit 390 of the terminal apparatus 3 calculates the position coordinates offset from the coordinates of the upper-left apex of the last read image region stored in the reading position information receiving unit 380 by the relative position (ΔX, ΔY) received as the reading position information, and guides the user to the calculated position coordinates as the reading position to be read this time.

As described above, when the reading position determining unit 250 determines the reading position, the reading position guiding unit 390 guides the user to the reading position, and the user specifies the reading position to which the user has been guided, for example, to thereby generate the second or subsequent authentication data. The second or subsequent authentication data includes the read image read based on the reading position, and the authentication data receiving unit 210 receives the image region as the authentication target read based on the reading position determined by the reading position determining unit 250. The authenticating unit 220 also determines authentication success or authentication failure in response to the second or subsequent authentication data, or requests further authentication data from the same user.

[1-4. Sequence Diagram and Flowcharts]

In the following, an example of a process executed in the authenticating system 1 according to the present embodiment will be described based on the sequence diagram and flowcharts illustrated in FIGS. 9 to 16.

[1-4-1. Overall Process]

[1-4-1 (1). Overall Process (S101 to S102)]

Figure 9:
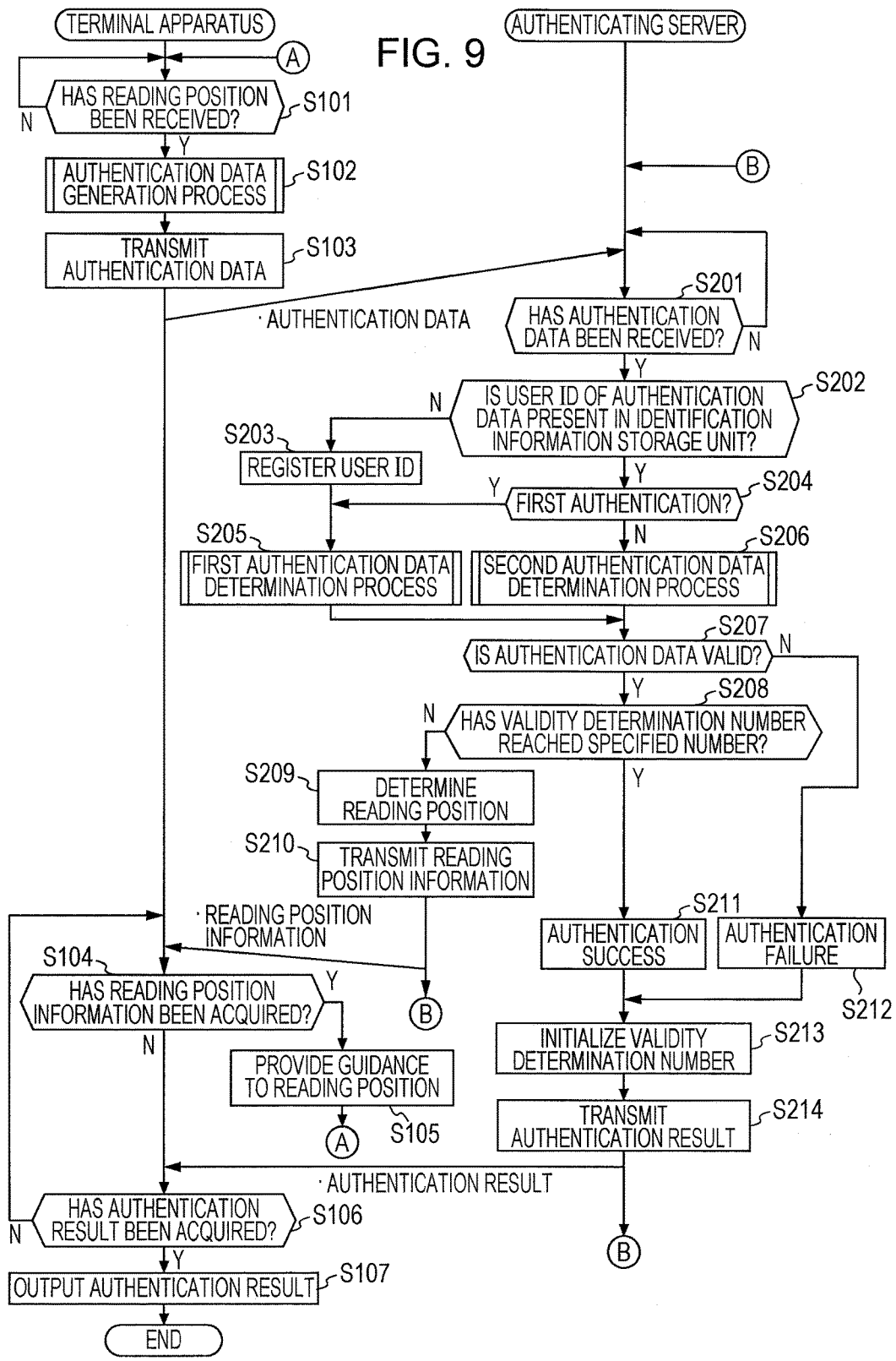
FIG. 9 is a sequence diagram illustrating an example of a process executed in the authenticating system according to a first embodiment.

FIG. 9 is a sequence diagram illustrating an example of the process executed in the authenticating system 1 according to the first embodiment. As illustrated in the drawing, the reading position receiving unit 310 of the terminal apparatus 3 determines whether or not the reading position of the target object 4 possessed by the user has been received (step S101). If the reading position receiving unit 310 has received the reading position (step S101: Y), the terminal apparatus 3 starts an authentication data generation process (step S102). Details of the authentication data generation process executed at step S102 will be described below based on the flowchart of FIG. 10.

[1-4-2. Authentication Data Generation Process]

Figure 10:
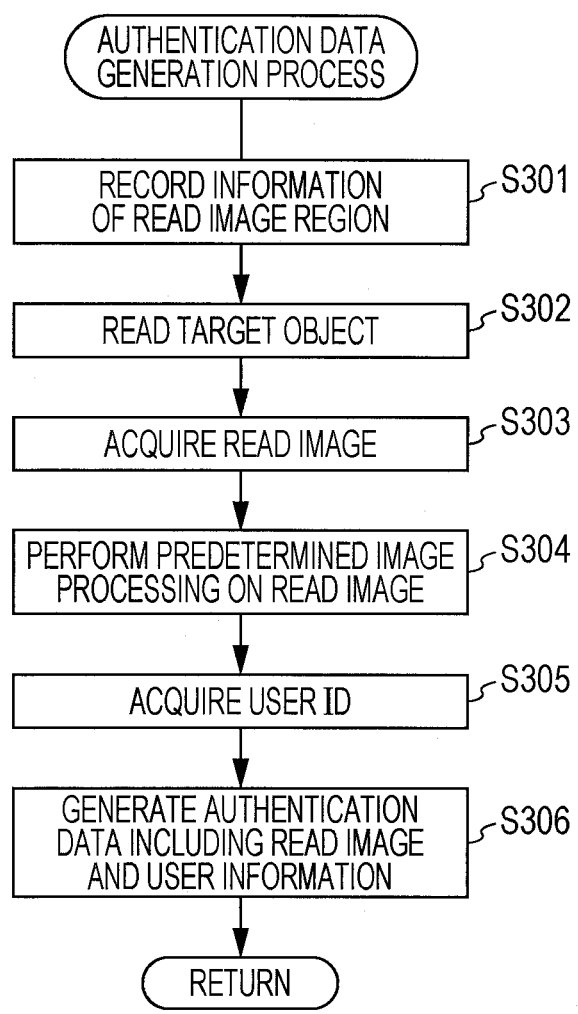
FIG. 10 is a flowchart illustrating an example of an authentication data generation process.

FIG. 10 is a flowchart illustrating an example of the authentication data generation process. As illustrated in the drawing, the reading position receiving unit 310 of the terminal apparatus 3 records the information of the read image region determined based on the received reading position in the reading position storage unit 510 (step S301). The reading unit 36 of the terminal apparatus 3 reads the surface of the target object 4 possessed by the user (step S302), and the read image acquiring unit 320 of the terminal apparatus 3 acquires the read image read by the reading unit 36 (step S303). The read image processing unit 330 of the terminal apparatus 3 performs predetermined image processing (change of the resolution, color tone correction, denoising, and a trimming process, for example) on the acquired read image (step S304). The identification information acquiring unit 340 of the terminal apparatus 3 acquires, for example, the user ID for identifying the user as the identification information (step S305). In the terminal apparatus 3, the authentication data transmitting unit 350 generates the authentication data including the read image and the user ID (step S306), and completes the authentication data generation process. Herein, the description will continue, returning to the sequence diagram illustrated in FIG. 9.

[1-4-1 (2). Overall Process (S103, S201 to S205)]

As illustrated in FIG. 9, the authentication data transmitting unit 350 of the terminal apparatus 3 transmits the authentication data generated at step S102 to the authenticating sever 2 (step S103). The authentication data receiving unit 210 of the authenticating server 2 determines whether or not the authentication data transmitted from the terminal apparatus 3 has been received (step S201). If the authentication data receiving unit 210 has received the authentication data (step S201: Y), the authenticating unit 220 of the authenticating server 2 determines authentication success or authentication failure in response to the received authentication data, or requests further authentication data from the same user.

Specifically, the identification information checking unit 221 of the authenticating server 2 checks if the user ID included in the received authentication data is present in the identification information storage unit 610 (step S202). If the user ID is absent (step S202: N), the registering unit 230 of the authenticating server 2 registers the user ID in the identification information storage unit 610 (step S203). The registration herein may be temporary registration (the state of so-called provisional registration), and the temporarily registered user ID may be deleted if the authentication data determining unit 227 of the authenticating server 2 has determined the authentication data to be invalid. Further, if the user ID is absent in the identification information storage unit 610 (step S202: N), the authenticating unit 220 may determine authentication failure in response to the received authentication data (step S212) without registering the user ID.

If the user ID included in the received authentication data is present in the identification information storage unit 610 (step S202: Y), the authenticating unit 220 determines whether or not the authentication data is for the first authentication (step S204). Specifically, the authenticating unit 220 refers to the validity determination number storage unit 650, determines the first authentication if a validity determined number of 1 or greater associated with the user ID is not stored (step S204: Y), and executes a first authentication data determination process (step S205). Details of the first authentication data determination process executed at step S205 will be described below based on the flowchart of FIG. 11.

[1-4-3. First Authentication Data Determination Process]

[1-4-3 (1). First Authentication Data Determination Process (S401 to S404)]

Figure 11:
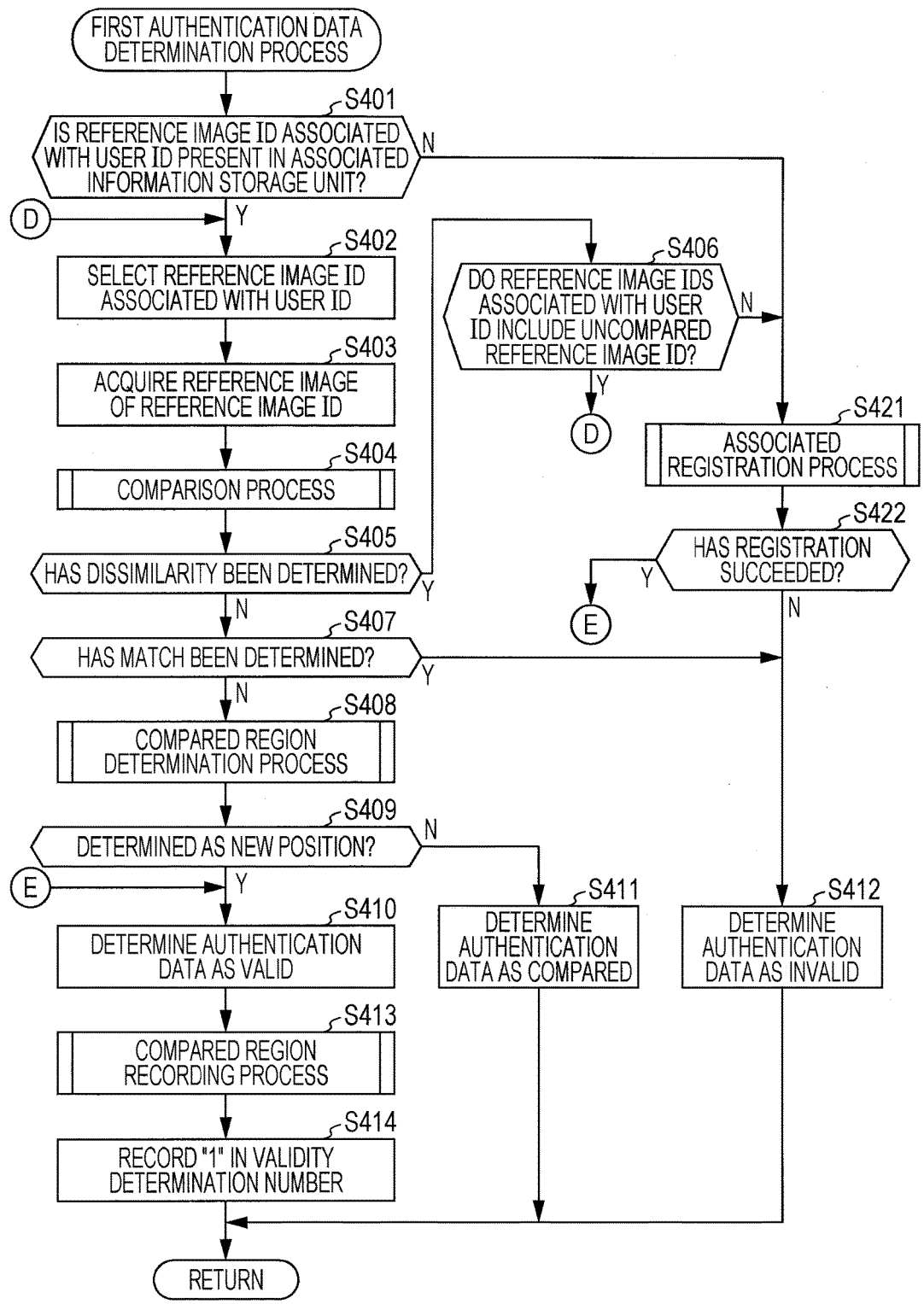
FIG. 11 is a flowchart illustrating an example of a first authentication data determination process.

FIG. 11 is a flowchart illustrating an example of the first authentication data determination process. As illustrated in the drawing, the reference image acquiring unit 222 of the authenticating server 2 determines whether the user ID included in the received authentication data is associated with any of the reference image IDs stored in the associated information storage unit 630 (step S401). If there is an associated reference image ID (step S401: Y), the reference image acquiring unit 222 selects the reference image ID associated with the user ID (step S402). The reference image acquiring unit 222 acquires the reference image indicated by the selected reference image ID from what is stored in the reference image storage unit 620 (step S403). The comparing unit 223 of the authenticating server 2 executes a comparison process between the read image included in the authentication data and the acquired reference image (step S404). Details of the comparison process executed at S404 will be described below based on the flowchart illustrated in FIG. 12.

[1-4-4. Comparison Process]

Figure 12:
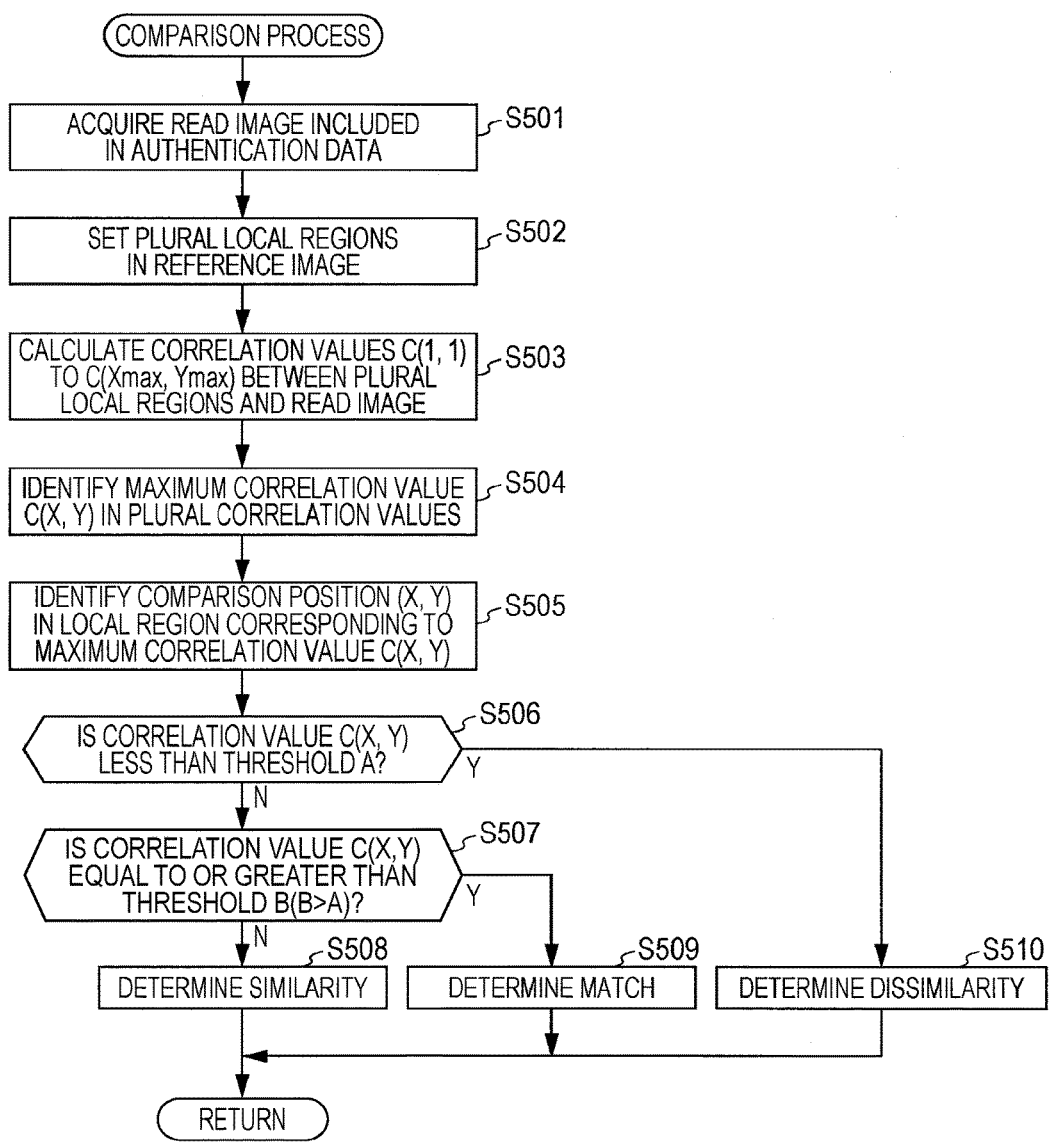
FIG. 12 is a flowchart illustrating an example of a comparison process.

FIG. 12 is a flowchart illustrating an example of the comparison process. As illustrated in the drawing, the comparing unit 223 of the authenticating server 2 acquires the read image included in the authentication data (step S501). The comparing unit 223 sets in the region of the reference image (the reference image region) a plurality of local regions of the same image size as that of the region of the read image (the read image region) (step S502). For example, regions located at positions shifted from the upper-left apex of the reference image region in the X direction and the Y direction by the S (S represents an integer equal to or greater than 1) number of dots at a time may be set as the plurality of local regions.

The comparing unit 223 calculates, for the set plurality of local regions, correlation values (C(1, 1) to C(Xmax, Ymax)) representing the degree of similarity to the read image (step S503). The comparing unit 223 identifies a correlation value C(X, Y) having the maximum value in the calculated plurality of correlation values (step S504). The comparing unit 223 identifies a local region corresponding to the maximum correlation value C(X, Y) as the local region corresponding to the read image region, and identifies a position in the local region (a position corresponding to the upper-left apex of the local region, for example) as a comparison position (X, Y) (step S505).

The comparing unit 223 determines whether the correlation value C(X, Y) identified at step S504 is equal to or greater than a threshold A serving as a criterion for similarity and less than a threshold B (B>A) serving as a criterion for match. Specifically, if the correlation value C(X, Y) is equal to or greater than the threshold A and less than the threshold B (step S506: N, step S507: N), the comparing unit 223 determines "similarity" between the read image region and the local region in the reference image region (step S508), and completes the comparison process. If the correlation value C(X, Y) is less than the threshold A (step S506: Y), the comparing unit 223 determines "dissimilarity" (step S510). If the correlation value C(X, Y) is equal to or greater than the threshold B (step S507: Y), the comparing unit 223 determines "match" (step S509). Herein, the description will continue, returning to the flowchart illustrated in FIG. 11.

[1-4-3 (2). First Authentication Data Determination Process (S405 to S408)]

Returning to FIG. 11, if the comparing unit 223 has determined "dissimilarity" (step S405: Y), the authenticating unit 220 of the authenticating server 2 determines whether reference image IDs associated with the user ID included in the authentication data include an uncompared reference image ID (step S406). If there is an uncompared reference image ID (step S406: Y), the reference image acquiring unit 222 of the authenticating server 2 selects the uncompared reference image ID (step S402), and acquires the reference image (step S403). The comparing unit 223 of the authenticating server 2 executes a process of comparing the acquired reference image with the read image (step S404).

For example, if the information group illustrated in FIG. 6 is previously stored in the associated information storage unit 630, the received authentication data includes user ID "U0002," and "dissimilarity" has been determined as a result of the comparison process with reference image ID "G0002," the reference image acquiring unit 222 selects uncompared reference image ID "G0003" associated with the same user ID "U0002," and acquires "reference image C" indicated by the information of the corresponding storage destination.

If the comparing unit 223 has determined "match" (step S407: Y), the authentication data determining unit 227 determines the authentication data to be invalid (step S412), and completes the first authentication data determination process. The case in which the comparing unit 223 determines "match" corresponds to that the received image region as the authentication target and a portion of the reference image region are deemed to match. For example, it is considered that the reference image managed by the authenticating server 2 has been leaked to a malicious third party, and that the third party has tried authentication with an image clipped from the reference image. In the above-described case, therefore, the authentication data determining unit 227 of the authenticating server 2 determines the received authentication data to be invalid authentication data.

At step S408, if the comparing unit 223 has determined "similarity" (step S405: N, step S407: N), the compared region determining unit 225 of the authenticating server 2 executes a compared region determination process of determining whether or not the comparison position (X, Y) identified in the comparison process at step S404 is included in a compared region (step S408). Details of the compared region determination process executed at step S408 will be described below based on the flowchart illustrated in FIG. 13.

[1-4-5. Compared Region Determination Process]

Figure 13:
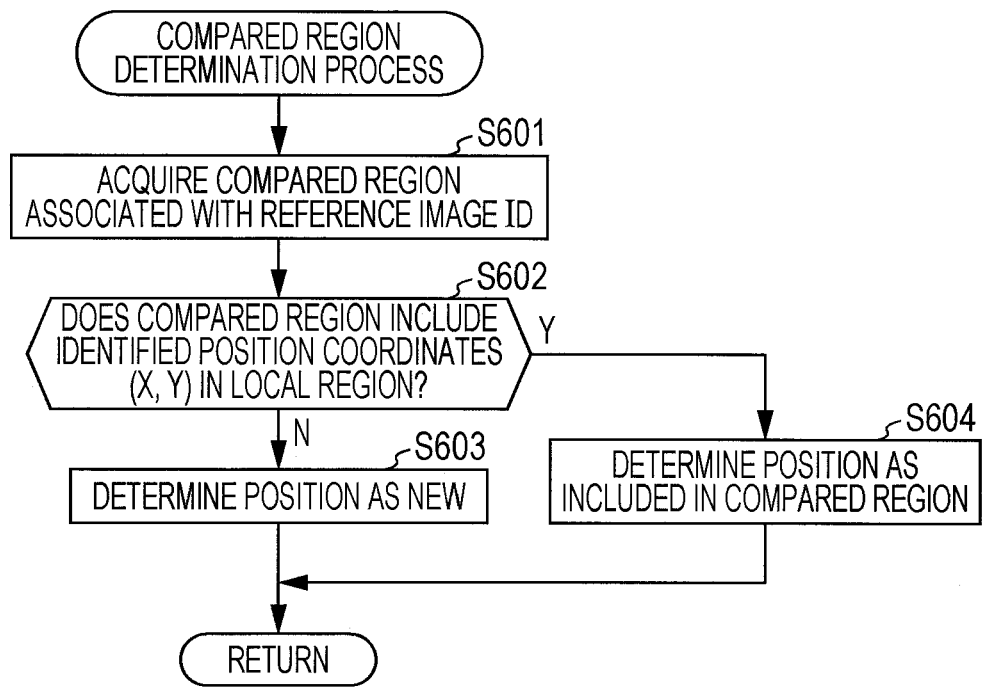
FIG. 13 is a flowchart illustrating an example of a compared region determination process.

FIG. 13 is a flowchart illustrating an example of the compared region determination process. As illustrated in the drawing, the compared region determining unit 225 of the authenticating server 2 acquires from what is stored in the compared region storage unit 640 compared regions associated with the reference image ID selected at step S402 or step S901 described later (step S601). The compared region determining unit 225 determines whether or not any of the acquired compared regions includes the comparison position (X, Y) identified by the comparison position identifying unit 224 of the authenticating server (step S602). If the comparison position (X, Y) is not included in any of the compared regions (step S602: N), the compared region determining unit 225 determines the comparison position (X, Y) to be a new position (step S603). If the comparison position (X, Y) is included in any of the compared regions (step S602: Y), the compared region determining unit 225 determines the comparison position (X, Y) to be a position included in the compared region (step S604), and completes the compared region determination process.

For example, if the compared regions illustrated in FIG. 7 are stored in the compared region storage unit 640, and if reference image ID "G0001" has been selected as the reference image, the compared region determining unit 225 determines whether or not the identified comparison position (X, Y) is included in any of the compared regions (X11, Y11) to (X12, Y12), (X13, Y13) to (X14, Y14), and (X15, Y15) to (X16, Y16). Herein, the description will continue, returning to the flowchart illustrated in FIG. 11.

[1-4-3 (3). First Authentication Data Determination Process (S409 to S413)]

Returning to FIG. 11, if the compared region determining unit 225 of the authenticating server 2 has determined the position to be new (step S409: Y), the authentication data determining unit 227 of the authenticating server 2 determines the received authentication data to be valid authentication data (step S410), and the compared region recording unit 226 of the authenticating server 2 executes a compared region recording process (step S413). Details of the compared region recording process executed at step S413 will be described below based on the flowchart illustrated in FIG. 14.

[1-4-6. Compared Region Recording Process]

Figure 14:
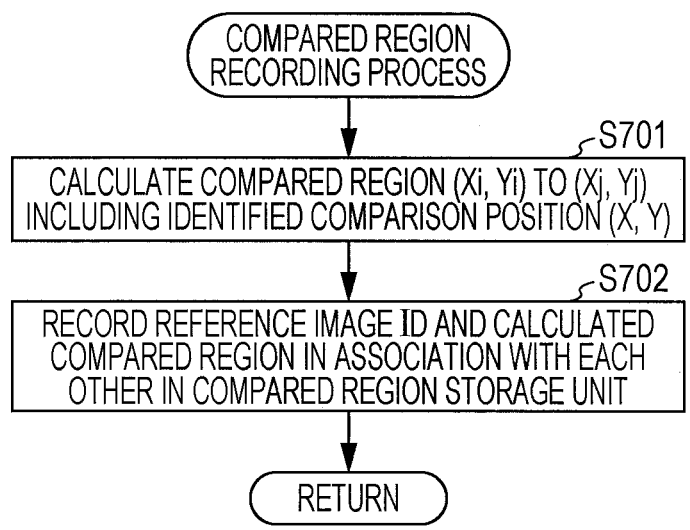
FIG. 14 is a flowchart illustrating an example of a compared region recording process.

FIG. 14 is a flowchart illustrating an example of the compared region recording process. As illustrated in the drawing, the compared region recording unit 226 of the authenticating server 2 calculates a compared region (Xi, Yi) to (Xj, Yj) including the comparison position (X, Y) identified by the comparison position identifying unit 224 of the authenticating server 2 (step S701). The compared region herein may be a region of a predetermined image size centering on the comparison position (X, Y) (a region formed of the a×b number of dots centering on the comparison position (X, Y), for example).

The compared region recording unit 226 records the calculated compared region (Xi, Yi) to (Xj, Yj) and the selected reference image ID in association with each other in the compared region storage unit 640 (step S702), and completes the compared region recording process. Herein, the description will continue, returning to the flowchart illustrated in FIG. 11.

[1-4-3 (4). First Authentication Data Determination Process (S414 to S421)]

Returning to FIG. 11, the authenticating unit 220 of the authenticating server 2 sets the validity determination number to "1" and records the validity determination number in the validity determination number storage unit 650 in association with the user ID included in the received authentication data and the selected reference image ID (step S414), and completes the first authentication data determination process.

Further, if the compared region determining unit 225 of the authenticating server 2 has determined the comparison position (X, Y) to be a position included in a compared region (step S409: N), the authentication data determining unit 227 of the authenticating server 2 determines the received authentication data to be compared authentication data (step S411), and completes the first authentication data determination process.

If the user ID included in the received authentication data is absent in the associated information storage unit 630 (step S401: N), or if the comparing unit 223 has determined that none of the reference images indicated by the reference image IDs associated with the user ID is similar (step S406: N), the registering unit 230 of the authenticating server 2 executes an associated registration process of newly registering the user ID and the reference image corresponding to the read image included in the received authentication data by associating the user ID and the reference image with each other (step S421). Details of the associated registration process executed at step S421 will be described below based on the flowchart illustrated in FIG. 15.

[1-4-7. Associated Registration Process]

Figure 15:
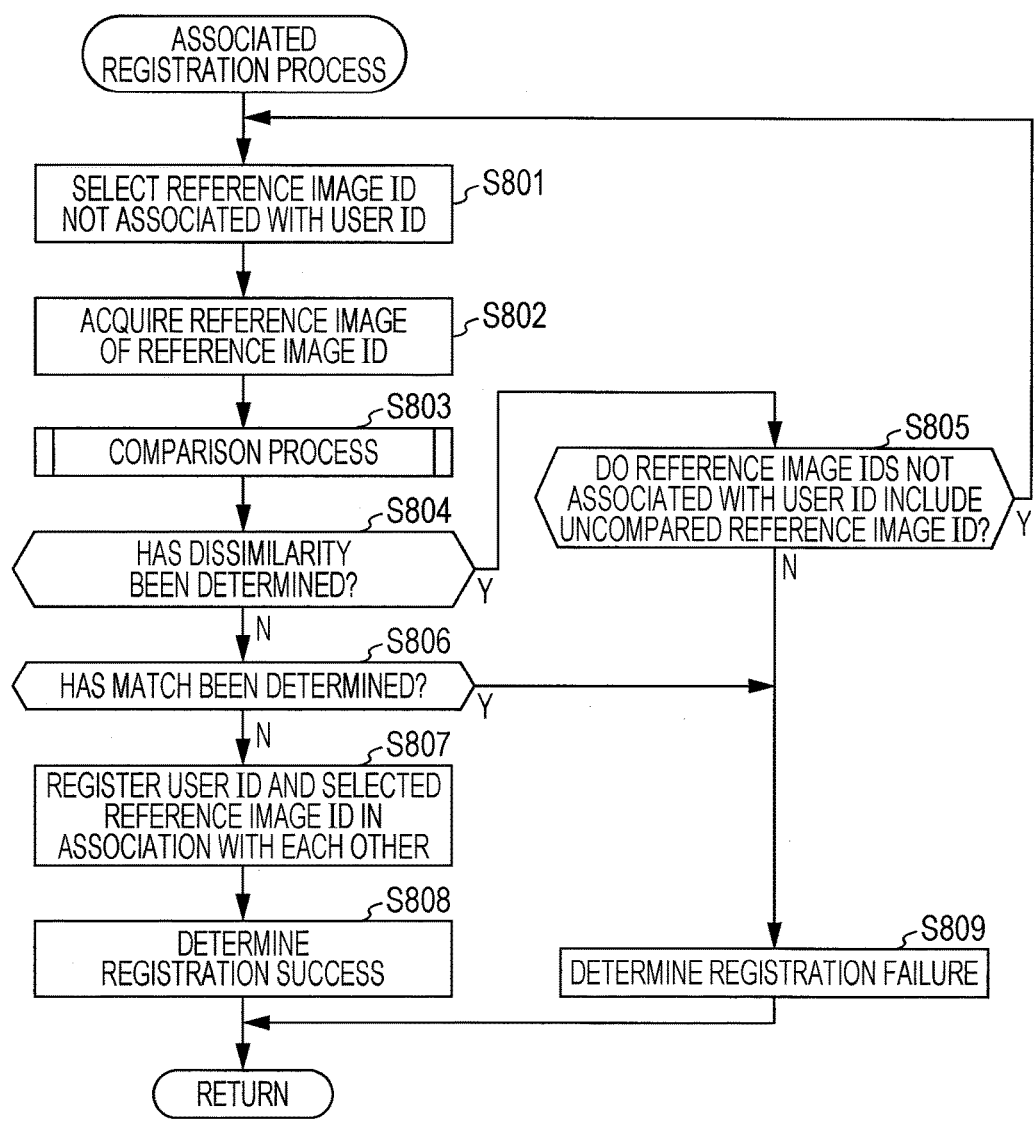
FIG. 15 is a flowchart illustrating an example of an associated registration process.

FIG. 15 is a flowchart illustrating an example of the associated registration process. As illustrated in the drawing, the registering unit 230 of the authenticating server 2 selects a reference image ID not associated with a user ID from the reference image IDs stored in the associated information storage unit 630 (step S801). For example, if the reference image IDs illustrated in FIG. 6 are stored in the associated information storage unit 630, the registering unit 230 selects reference image ID "G0005" not associated with a user ID.

The registering unit 230 acquires the reference image indicated by the selected reference image ID by using a function included in the authenticating unit 220 (step S802), and compares the reference image with the received read image as the authentication target (step S803). If similarity has been determined as a result of the comparison (step S804: N, step S806: N), the registering unit 230 registers the reference image ID selected at step S801 and the user ID in the associated information storage unit 630 by associating the reference image ID and the user ID with each other (step S807), determines registration success (step S808), and completes the associated registration process.

If dissimilarity has been determined as a result of the comparison (step S804: Y), the registering unit 230 determines whether there is an uncompared reference image ID in reference image IDs not associated with a user ID in the associated information storage unit 630 (step S805). If there is an uncompared reference image ID (step S805: Y), the registering unit 230 selects the reference image ID (step S801), and executes the comparison process again. If there is no uncompared reference image ID (step S805: N), or if a match is determined as a result of the comparison (S806: Y), the registering unit 230 determines registration failure (step S809), and completes the associated registration process. Herein, the description will continue, returning to the flowchart of FIG. 11.

[1-4-3 (5). First Authentication Data Determination Process (S422)]

Returning to FIG. 11, if the registering unit 230 of the authenticating server 2 has determined registration success (step S422: Y), the authentication data determining unit 227 of the authenticating server 2 determines the received authentication data to be valid authentication data (step S410). The compared region recording unit 226 of the authenticating server 2 executes the process of recording the compared region (step S413), and the authenticating unit 220 of the authenticating server 2 records the validity determination number (step S414) and completes the first authentication data determination process. Further, if registration failure has been determined (step S422: N), the authentication data determining unit 227 determines the received authentication data to be invalid authentication data (step S412), and completes the first authentication data determination process. Herein, the description will continue, returning to the sequence diagram illustrated in FIG. 9.

[1-4-1 (3). Overall Process (S207 to S210, S104 to S105)]

Returning to FIG. 9, if the authentication data determining unit 227 of the authenticating server 2 has determined the authentication data to be valid (step S207: Y), the authenticating unit 220 of the authenticating server 2 determines whether the validity determination number stored in the validity determination number storage unit 650 has reached a specified number (step S208). For example, the authenticating unit 220 determines whether or not the validity determination number corresponding to the user ID included in the received authentication data and the selected reference image ID in the validity determination numbers illustrated in FIG. 8 has reached a set threshold.

If the validity determination number has not reached the threshold (step S208: N), the reading position determining unit 250 of the authenticating server 2 determines the reading position of the read image region to be read next time from the target object 4 possessed by the user (step S209), and the reading position information transmitting unit 260 of the authenticating server 2 transmits the reading position information representing the determined reading position to the terminal apparatus 3 (step S210). In the present embodiment, the reading position determining unit 250 determines the reading position in the regions excluding the compared regions stored in the compared region storage unit 640, and the reading position information transmitting unit 260 of the authenticating server 2 transmits the relative position (ΔX, ΔY) from the comparison position (X, Y) identified by the comparison position identifying unit 224 of the authenticating server 2 to the above-determined reading position as the reading position information.

The reading position information receiving unit 380 of the terminal apparatus 3 determines whether or not the transmitted reading position information has been received (step S104). If the reading position information receiving unit 380 has received the reading position information (step S104: Y), the reading position guiding unit 390 of the terminal apparatus 3 guides the user to the reading position to be read from the target object 4 (step S105), and the reading position receiving unit 310 receives the reading position from the user (step S101). If the reading position has been received (step S101: Y), the terminal apparatus 3 generates the second or subsequent authentication data including the read image region based on the reading position (step S102), and the authentication data transmitting unit 350 of the terminal apparatus 3 transmits the second or subsequent authentication data (step S103).

If it has been determined in the authenticating server 2 that the received authentication data is for the second or subsequent authentication (step S204: N), the authenticating unit 220 of the authenticating server 2 executes a second authentication data determination process (step S206). Details of the second authentication data determination process executed at step S206 will be described below based on the flowchart illustrated in FIG. 16.

[1-4-8. Second Authentication Data Determination Process]

Figure 16:
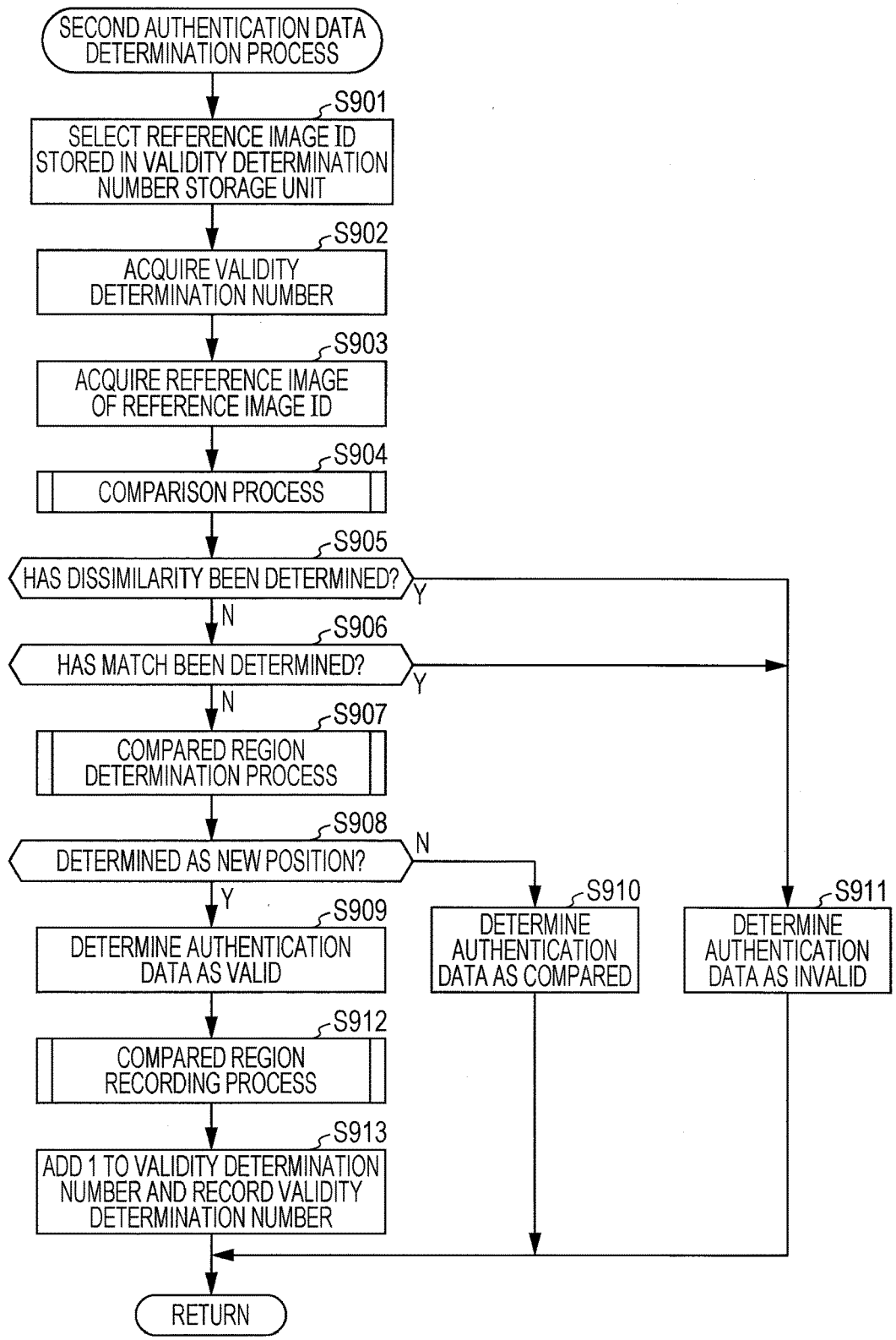
FIG. 16 is a flowchart illustrating an example of a second authentication data determination process.

FIG. 16 is a flowchart illustrating an example of the second authentication data determination process. As illustrated in the drawing, the reference image acquiring unit 222 of the authenticating server 2 selects a reference image ID associated with the user ID included in the received authentication data from the reference image IDs stored in the validity determination number storage unit 650 (step S901), and acquires the validity determination number associated with the user ID (step S902).

In the second authentication data determination process, the determination process between the received read image as the authentication target and the reference image and the compared region recording process are executed similarly to the first authentication data determination process (steps S903 to S912). If the received authentication data is determined to be valid authentication data (step S909), the authenticating unit 220 of the authenticating server 2 adds 1 to the validity determination number associated with the user ID included in the authentication data and records the validity determination number in the validity determination number storage unit 650 (step S913), and completes the second authentication data determination process. Herein, the description will continue, returning to the sequence diagram illustrated in FIG. 9.

[1-4-1 (4). Overall Process (S207 to S214, S106 to S107)]

Returning to FIG. 9, if the received authentication data is valid authentication data (step S207: Y), and if the validity determination number has reached the specified number (step S208: Y), the authenticating unit 220 of the authenticating server 2 determines authentication success in response to the received authentication data (step S211), and initializes the validity determination number stored in the validity determination number storage unit 650 and associated with the user ID included in the authentication data and the selected reference image ID (step S213). Further, if the received authentication data has failed to be determined to be valid authentication data by the authentication data determining unit 227 of the authenticating server 2 (step S207: N), the authenticating unit 220 determines authentication failure in response to the received authentication data (step S212), and initializes the validity determination number (step S213).

The authentication result transmitting unit 240 of the authenticating server 2 transmits the authentication result to the terminal apparatus 3 (step S214). The authentication result receiving unit 360 of the terminal apparatus 3 determines whether or not the transmitted authentication result has been received (step S106). If the authentication result receiving unit 360 has received the authentication result (step S106: Y), the authentication result output unit 370 of the terminal apparatus 3 outputs the received authentication result (step S107), and completes the process.

The authenticating system 1 according to the above-described first embodiment executes the authentication based on the comparison between the read image region read from the target object 4 and the reference image region, and executes the authentication based on the position corresponding to the read image region. Specifically, if the corresponding position in the reference image region is included in a compared region including the position corresponding to a read image region received in the past, the authenticating system 1 determines authentication failure in response to the received authentication request. In the authentication based on the image region read from the surface of the target object 4, therefore, the authenticating system 1 prevents unauthorized access reusing an image region used in the past.

2. Second Embodiment

In the first embodiment, a description has been given of a case in which the authentication data including the identification information such as the user ID is transmitted to the authenticating server 2. The authenticating data transmitted to the authenticating server 2 may not necessarily include the identification information. In the following second embodiment, description will be given of a case in which authentication data not including the identification information is transmitted to the authenticating sever 2.

[2-1. Hardware Configuration and Functional Blocks]

The system configuration and the hardware configuration of the authenticating system 1 according to the second embodiment are similar to those of the first embodiment. Further, the authenticating server 2 according to the second embodiment is assumed not to include the identification information acquiring unit 340 in the functional blocks illustrated in FIG. 3. The authentication data handled in the present embodiment, therefore, does not include the user ID. The authenticating server 2 according to the second embodiment is assumed not to include the registering unit 230. It is assumed in the second embodiment that the users as authentication targets are previously registered, and that each of the plurality of reference image IDs is previously associated with a user ID in the associated information storage unit 630.

[2-2. Sequence Diagram and Flowchart]

In the following, an example of a process executed in the authenticating system 1 according to the second embodiment will be described based on the sequence diagram and the flowchart illustrated in FIGS. 17 and 18.

[2-2-1. Overall Process]

[2-2-1 (1). Overall Process (S1101 to S1103, S1201 to S1202)]

Figure 17:
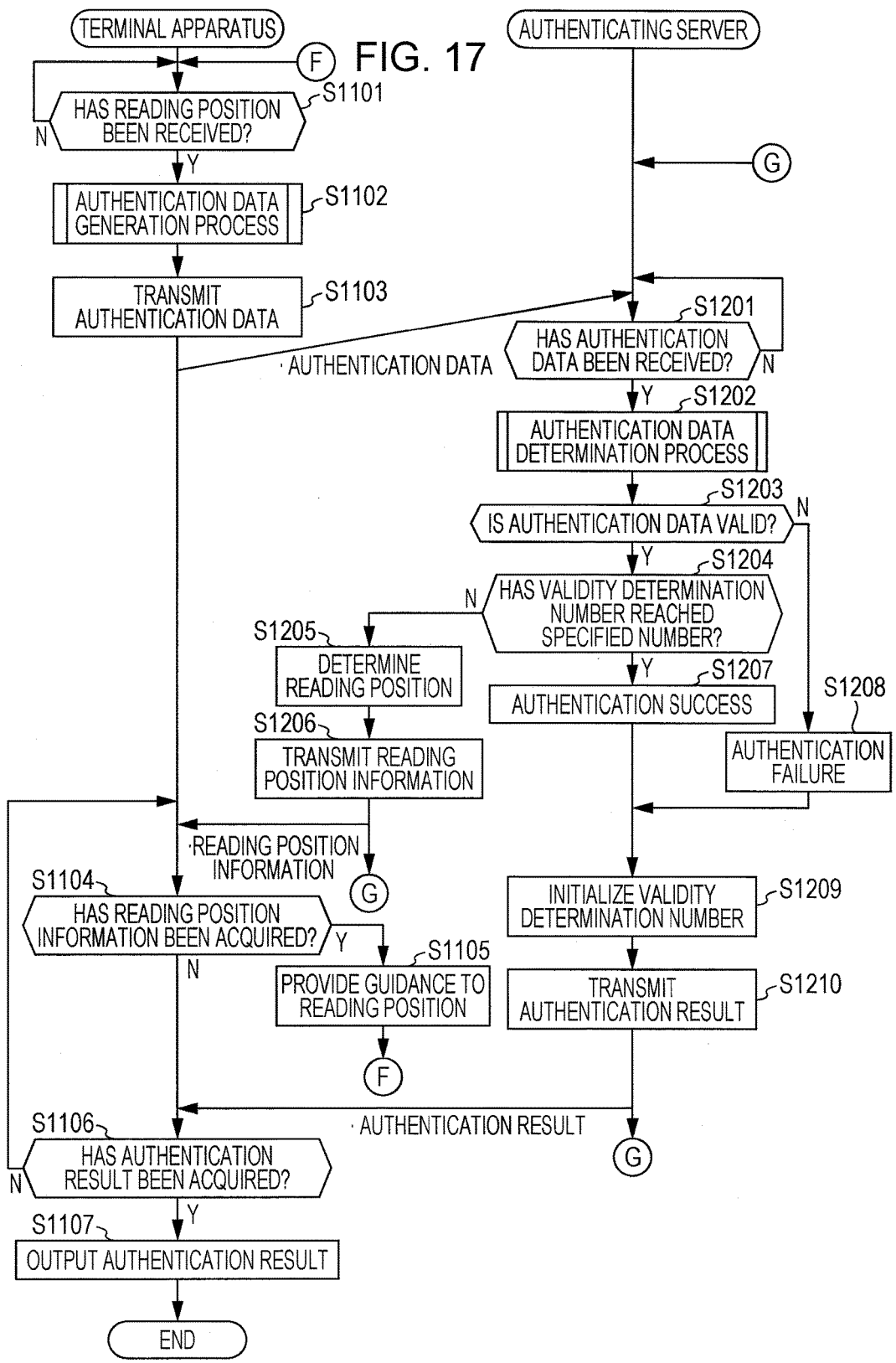
FIG. 17 is a sequence diagram illustrating an example of a process executed in an authenticating system according to a second embodiment.

FIG. 17 is a sequence diagram illustrating an example of the process executed in the authenticating system 1 according to the second embodiment. As illustrated in the drawing, if the reading position receiving unit 310 of the terminal apparatus 3 receives the reading position of the target object 4 possessed by the user (step S1101: Y), the terminal apparatus 3 executes the process of generating the authentication data (step S1102). At step S1102, the acquisition of the user ID at step S305 in the authentication data generation process illustrated in FIG. 10 is not performed. At step S306, the authentication data only including the read image is generated.

Returning to FIG. 17, if the authentication data receiving unit 210 of the authenticating server 2 receives the authentication data (step S1201: Y), the authenticating unit 220 of the authenticating server 2 executes the authentication data determination process irrespective of whether the authentication is performed for the first time or the second or subsequent time (step S1202). Details of the authentication data determination process executed at step S1202 will be described below based on the flowchart of FIG. 18.

[2-2-2. Authentication Data Determination Process]

Figure 18:
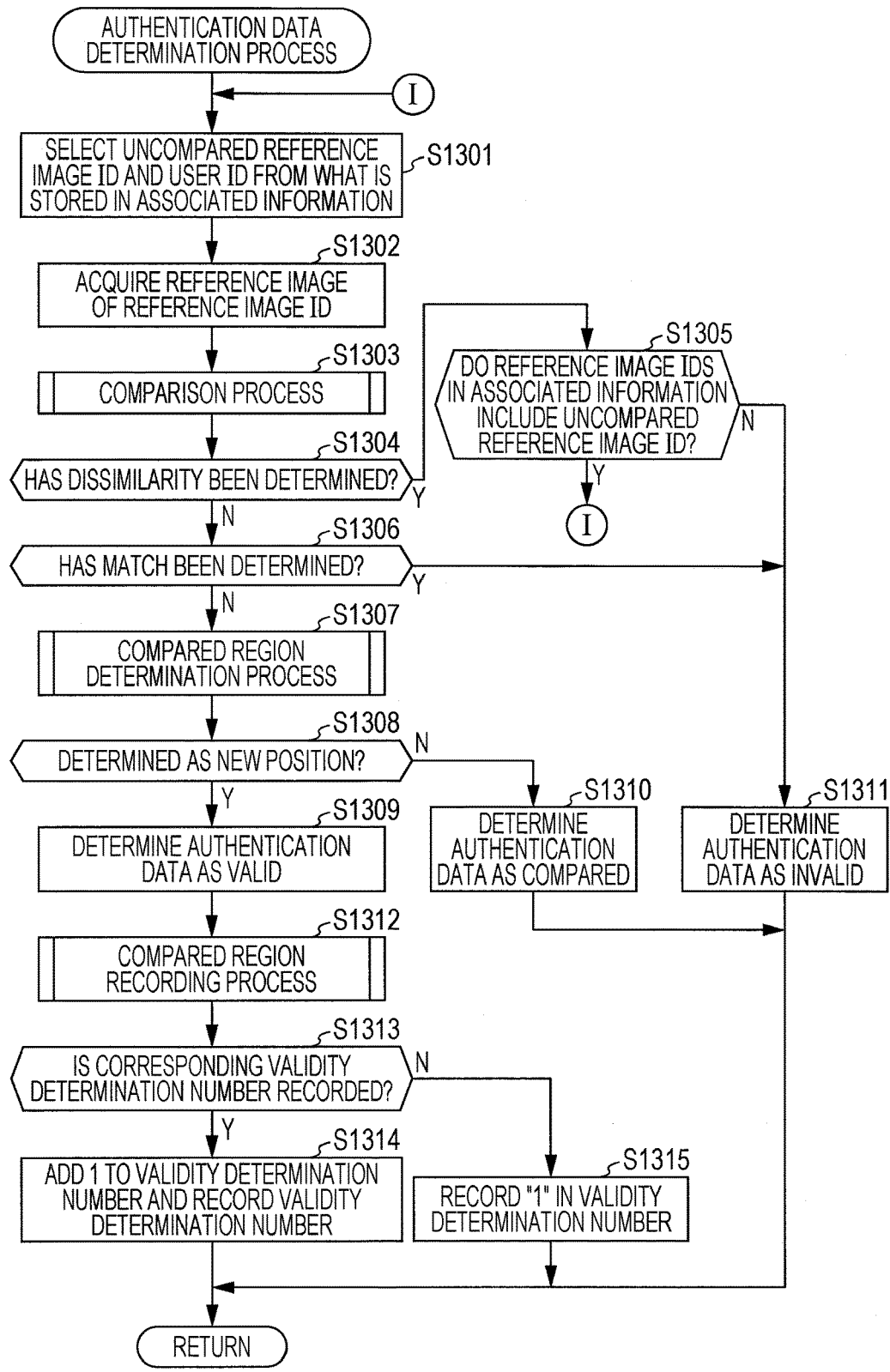
FIG. 18 is a flowchart illustrating an example of an authentication data determination process according to the second embodiment.

FIG. 18 is a flowchart illustrating an example of the authentication data determination process. As illustrated in the drawing, the reference image acquiring unit 222 of the authenticating server 2 selects an uncompared reference image ID and the user ID associated with the reference image ID from what is stored in the associated information storage unit 630 (step S1301), and acquires the reference image indicated by the selected reference image ID (step S1302).

The comparing unit 223 of the authenticating server 2 compares the acquired reference image with the read image included in the received authentication data similarly to the first embodiment (step S1303). If dissimilarity has been determined as a result of the comparison (step S1304: Y), the reference image acquiring unit 222 of the authenticating server 2 determines whether the reference image IDs stored in the associated information storage unit 630 include an uncompared reference image ID (step S1305). Herein, if there is an uncompared reference image ID (step S1305: Y), the reference image acquiring unit 222 selects the uncompared reference image ID and the user ID (step S1301), and the comparing unit 223 executes the comparison process again (step S1303). Further, if there is no uncompared reference image ID (step S1305: N), the authentication data determining unit 227 of the authenticating server 2 determines the authentication data to be invalid (step S1311), and completes the authentication data determination process. If a match has been determined as a result of the comparison by the comparing unit 223 (step S1306: Y), the authentication data determining unit 227 determines the authentication data to be invalid (step S1311), and completes the authentication data determination process.

In the present embodiment, the read image as the authentication target is thus repeatedly compared with the plurality of reference images related to the plurality of reference image IDs to identify the reference image ID corresponding to the read image as the authentication target, and the authentication process is executed.

Further, if similarity has been determined as a result of the comparison by the comparing unit 223 of the authenticating server 2 (step S1304: N, step S1306: N), the compared region determining unit 225 of the authenticating server 2 executes the compared region determination process similarly to the first embodiment (step S1307) to determine whether the comparison position in the reference image region corresponding to the read image region is included in a compared region. If the comparison position has been determined to be a position included in a compared region (step S1308: N), the authentication data determining unit 227 determines that the authentication data has been compared (step S1310), and completes the authentication data determination process. Further, if the comparison position has been determined to be a new position (step S1308: Y), the authentication data determining unit 227 of the authenticating server 2 determines the received authentication data to be valid authentication data (step S1309), and the compared region recording unit 226 of the authenticating server 2 records the compared region including the identified comparison position in the compared region storage unit 640 similarly to the first embodiment (step S1312).

The authenticating unit 220 of the authenticating server 2 determines whether the validity determination number associated with the reference image ID and the user ID selected at step S1301 is stored in the validity determination number storage unit 650 (step S1313). If the validity determination number is stored (step S1313: Y), the authenticating unit 220 adds 1 to the validity determination number and records the validity determination number (step S1314). If the validity determination number is not stored (step S1313: N), the authenticating unit 220 sets the validity determination number to "1" and records the validity determination number in association with the selected reference image ID and user ID (step S1315), and completes the authentication data determination process. The description will continue, returning to the sequence diagram illustrated in FIG. 17.

[2-2-1 (2). Overall Process (S1203 to S1210, S1104 to S1107)]

Returning to FIG. 17, if the authentication data determining unit 227 of the authenticating server 2 has determined the authentication data to be valid (step S1203: Y), the authenticating unit 220 of the authenticating server 2 determines whether the validity determination number stored in the validity determination number storage unit 650 has reached a specified number (step S1204). The authenticating unit 220 determines whether or not the validity determination number corresponding to the reference image ID and the user ID selected at step S1202 in the validity determination numbers illustrated in FIG. 8, for example, has reached a set threshold.

If the validity determination number has not reached the threshold (step S1204: N), the reading position determining unit 250 of the authenticating server 2 determines the reading position of the read image region to be read next time from the target object 4 possessed by the user similarly to the first embodiment (step S1205), and the reading position information transmitting unit 260 of the authenticating sever 2 transmits the reading position information representing the determined reading position to the terminal apparatus 3 (step S1206). If the reading position information receiving unit 380 of the terminal apparatus 3 receives the reading position information (step S1104: Y), the reading position guiding unit 390 of the terminal apparatus 3 guides the user to the reading position to be read from the target object 4 (step S1105), and the reading position receiving unit 310 receives the reading position from the user (step S1101). If the reading position is received (step S1101: Y), the terminal apparatus 3 generates the second or subsequent authentication data including the read image region based on the reading position (step S1102), and the authentication data transmitting unit 350 of the terminal apparatus 3 transmits the second or subsequent authentication data (step S1103).

Further, if the received authentication data is valid authentication data (step S1203: Y), and if the validity determination number has reached the specified number (step S1204: Y), the authenticating unit 220 of the authenticating server 2 determines authentication success in response to the received authentication data (step S1207), and initializes the validity determination number stored in the validity determination number storage unit 650 and associated with the user ID and the reference image ID selected at step S1202 (step S1209). Further, if the received authentication data has failed to be determined to be valid authentication data by the authentication data determining unit 227 of the authenticating server 2 (step S1203: N), the authenticating unit 220 determines authentication failure in response to the received authentication data (step S1208), and initializes the validity determination number (step S1209).

The authentication result transmitting unit 240 of the authenticating sever 2 transmits the authentication result to the terminal apparatus 3 (step S1210). If the authentication result receiving unit 360 of the terminal apparatus 3 receives the transmitted authentication result (step S1106: Y), the authentication result output unit 370 of the terminal apparatus 3 outputs the received authentication result (step S1107), and completes the process.

In the authenticating system 1 according to the above-described second embodiment, the authentication data may not necessarily include the identification information. Further, in the authentication based on the image region read from the surface of the target object 4, the authenticating system 1 according to the second embodiment prevents unauthorized access reusing an image region used in the past similarly to the case of the first embodiment.

3. Modified Examples

Examples of modifying the embodiments of the present invention (modified examples) will be described below.

(1) In the embodiments, a description has been given of a case in which the reading position determining unit 250 determines the reading position to be read next time from the target object 4 in the reference image region corresponding to the read image region as the authentication target excluding the compared regions associated with the reference image ID. For example, the reading position determining unit 250 may determine the reading position to be read for the first time.

Specifically, the terminal apparatus 3 transmits a request for the reading position to the authenticating server 2 before the reading unit 36 starts reading the target object 4. In this case, the reading position determining unit 250 of the authenticating server 2 determines the reading position in accordance with the transmitted request for the reading position. The reading position determining unit 250 may determine, for example, a random position in a region of a predetermined image size.

The storage unit 32 of the terminal apparatus 3 may store the information concerning a region corresponding to the reference image region (a region having the same image size as that of the reference image region, for example). In this case, the reading position information transmitting unit 260 transmits the position coordinates (X, Y) of the determined reading position. The reading position guiding unit 390 guides the user to the position corresponding to the transmitted position coordinates (X, Y) in the region corresponding to the reference image region stored in the storage unit 32 as the reading position.

Further, the request for the reading position transmitted from the terminal apparatus 3 may include the identification information (the user ID, for example). In this case, the reading position determining unit 250 may determine the reading position in the reference image region associated with the transmitted user ID excluding the used regions associated with the reference image ID.

(2) In the embodiments, a description has been given of a case in which, if the authentication data is valid, and if the number of times by which the authentication data has been determined to be valid has not reached the threshold, the reading position determining unit 250 determines the reading position of the read image region to be read next time from the target object 4 possessed by the user. For example, if the comparison position identified by the comparison position identifying unit 224 is included in a compared region stored in the compared region storage unit 640 for one reference image region corresponding to the read image region as the authentication target, the reading position determining unit 250 may determine the reading position of the image region to be read next time.

More specifically, immediately before step S207 of determining whether the received authentication data is valid authentication data in the sequence illustrated in FIG. 9, the authenticating unit 220 determines whether the authentication data is compared authentication data. Herein, if the authentication data has been determined to be compared authentication data, the reading position determining unit 250 determines the reading position (step S209), and the reading position information transmitting unit 260 transmits the reading position information (step S210).

As described above, the condition for the reading position determining unit 250 to determine the reading position may be, other than that the received authentication data is accepted as valid, that the comparison position in the reference image region corresponding to the read image region included in the authentication data is included in a compared region including an already compared comparison position.

(3) In the embodiments, a description has been given of a case in which the image size of the reference image region previously stored in the reference image storage unit 620 is greater than the image size of the read image region as the authentication target. The image size of the reference image region, however, may be equal to or smaller than the image size of the read image region.

In this case, for example, the comparing unit 223 extracts from the read image region a local region having the same image size as that of the reference image region, and calculates the correlation value of the image feature between the local region and the reference image region. For example, if the number of dots in the read image region and the number of dots in the reference image region are represented as A1×B1 and A2×B2 (A1>A2, B1>B2), respectively, the (A1−A2+1)×(B1−B2+1) number of correlation values are calculated in one comparison process. Based on the maximum value of the above-calculated plurality of correlation values, the comparing unit 223 determines similarity, match, or dissimilarity between the local region in the read image region as the authentication target and the reference image region.

Further, if the image size of the reference image region is equal to or smaller than the image size of the read image region, the comparison position identifying unit 224 may identify the position corresponding to one reference image region corresponding to the read image region as the authentication target and the read image region. More specifically, in the plurality of local regions set in the read image region, the comparison position identifying unit 224 identifies a position in a local region (that is, a position in the read image region) in which the correlation value is maximized as the comparison position. For example, the position in the read image region may be expressed by a coordinate position in a coordinate system of the read image region, with the origin set to a predetermined apex (the upper-left apex, for example) of the read image region and the X axis and the Y axis set in the horizontal direction and the vertical direction, respectively.

Further, if the image size of the reference image region is equal to or smaller than the image size of the read image region, the compared region recording unit 226 may record the information of the compared region including the corresponding position in the read image region (the coordinate position in the coordinate system of the read image region) in the compared region storage unit 640 in association with the reference image ID indicating the reference image region corresponding to the read image region.

Further, if the image size of the reference image region is equal to or smaller than the image size of the read image region, the compared region determining unit 225 may determine whether or not the position in the read image region corresponding to the reference image region is included in a compared region stored in the compared region storage unit 640 in association with the reference image ID indicating the reference image region. Further, if the compared region determining unit 225 has determined that the position in the read image region corresponding to the reference image region is included in a compared region, the authentication data determining unit 227 may determine the received authentication request to be invalid, and the authenticating unit 220 may determine authentication failure in response to the received authentication request.

As described above, even if the image size of the reference image region is equal to or smaller than the image size of the read image region, the authenticating system 1 is capable of preventing unauthorized access reusing a read image region used in the past.

(4) In the embodiment examples, a description has been given of a case in which the authenticating system 1 is configured by the authenticating server 2 and the terminal apparatuses 3. For example, the authenticating system 1 may be configured by a single authenticating server 2, not including the terminal apparatuses 3. That is, the reading unit 36 such as a camera included in the authenticating server 2 may read the surface of the target object 4, and the display unit 35 such as a display included in the authenticating server 2 may output the authentication result and provide guidance to the reading position of the target object 4. In this case, the hardware configuration of the authenticating server 2 includes, for example, functions equivalent to the operation unit 34, the display unit 35, and the reading unit 36 of the terminal apparatus 3 described in the embodiments, and includes functions corresponding to the respective functional blocks of the terminal apparatus 3.

The invention claimed is:

1. An authenticating apparatus comprising:
  a receiving unit that receives an image region as an authentication target read from a surface of a target object possessed by a user together with an authentication request from the user; and
  at least one hardware processor configured to implement:
    an identifying unit that identifies a position corresponding to the image region as the authentication target and one reference image region corresponding to the image region as the authentication target in a plurality of previously stored reference image regions read from respective surfaces of a plurality of target objects; and
    an authenticating unit that executes authentication in response to the authentication request based on the identified position,
  wherein the identifying unit identifies a position in the one reference image region corresponding to the image region as the authentication target in the plurality of reference image regions,
  wherein the authenticating apparatus further comprises an authentication request determining unit that determines whether or not the authentication request is valid based on whether or not the identified position in the reference image region is included in a used image region including a position identified in past for the reference image region by the identifying unit, and
  wherein if the authentication request determining unit has determined that the authentication request is not valid, the authenticating unit determines authentication failure in response to the authentication request.

2. The authenticating apparatus described in claim 1, wherein, if the authentication request determining unit has determined a predetermined number of times that the authentication request received from the same user by the receiving unit is valid, the authenticating unit determines authentication success in response to the authentication request received from the user.

3. The authenticating apparatus described in claim 1, further comprising a registering unit that registers identification information to be linked to each of at least parts of the plurality of reference image regions,
  wherein the receiving unit receives identification information together with the authentication request, and
  wherein the authentication request determining unit determines whether or not the received authentication request is valid based on whether or not the registered identification information matches the received identification information.

4. The authenticating apparatus described in claim 2, further comprising a registering unit that registers identification information to be linked to each of at least parts of the plurality of reference image regions,
  wherein the receiving unit receives identification information together with the authentication request, and
  wherein the authentication request determining unit determines whether or not the received authentication request is valid based on whether or not the registered identification information matches the received identification information.

5. The authenticating apparatus described in claim 1, further comprising a reading position determining unit that determines a reading position of an image region to be read from the target object possessed by the user,
  wherein the receiving unit receives the image region as the authentication target read based on the reading position determined by the reading position determining unit.

6. The authenticating apparatus described in claim 2, further comprising a reading position determining unit that determines a reading position of an image region to be read from the target object possessed by the user,
  wherein the receiving unit receives the image region as the authentication target read based on the reading position determined by the reading position determining unit.

7. The authenticating apparatus described in claim 5, wherein the reading position determining unit determines a reading position of an image region to be read next time from the target object possessed by the user in the one reference image region corresponding to the image region as the authentication target excluding the used image region.

8. The authenticating apparatus described in claim 6, wherein the reading position determining unit determines a reading position of an image region to be read next time from the target object possessed by the user in the one reference image region corresponding to the image region as the authentication target excluding the used image region.

9. The authenticating apparatus described in claim 7, wherein, if the authentication request has been determined to be valid by the authentication request determining unit, the reading position determining unit determines the reading position of the image region to be read next time from the target object possessed by the user.

10. The authenticating apparatus described in claim 8, wherein, if the authentication request has been determined to be valid by the authentication request determining unit, the reading position determining unit determines the reading position of the image region to be read next time from the target object possessed by the user.

11. The authenticating apparatus described in claim 7, wherein, if the identified position is included in the used image region, the reading position determining unit determines the reading position of the image region to be read next time from the target object possessed by the user.

12. The authenticating apparatus described in claim 8, wherein, if the identified position is included in the used image region, the reading position determining unit determines the reading position of the image region to be read next time from the target object possessed by the user.

13. The authenticating apparatus described in claim 1, wherein, if a maximum value of correlation values between local regions set for each of the plurality of reference image regions and the image region as the authentication target is equal to or greater than a first threshold serving as a criterion for similarity and less than a second threshold serving as a criterion for match, the identifying unit identifies a position in a local region corresponding to the maximum value as a position in the one reference image region corresponding to the image region as the authentication target.

14. The authenticating apparatus described in claim 13, wherein, if the maximum value of the correlation values between the local regions set for each of the plurality of reference image regions and the image region as the authentication target is less than the first threshold or equal to or greater than the second threshold, the identifying unit does not identify the position in the one reference image region, and
wherein, if the position in the reference image region has failed to be identified by the identifying unit, the authenticating unit determines authentication failure in response to the received authentication request.

15. The authenticating apparatus described in claim 1, wherein an image size of the reference image region is greater than an image size of the image region as the authentication target.

16. An authenticating system comprising a terminal apparatus and an authenticating apparatus, wherein the terminal apparatus includes
a reading unit that reads a surface of a target object possessed by a user, and
a unit that transmits an image region as an authentication target read by the reading unit together with an authentication request from the user, and
wherein the authenticating apparatus includes
a receiving unit that receives the image region as the authentication target and the authentication request transmitted,
an identifying unit that identifies a position corresponding to the image region as the authentication target and one reference image region corresponding to the image region as the authentication target in a plurality of previously stored reference image regions read from respective surfaces of a plurality of target objects, and
an authenticating unit that executes authentication in response to the authentication request based on the identified position,
wherein the identifying unit identifies a position in the one reference image region corresponding to the image region as the authentication target in the plurality of reference image regions,
wherein the authenticating apparatus further comprises an authentication request determining unit that determines whether or not the authentication request is valid based on whether or not the identified position in the reference image region is included in a used image region including a position identified in past for the reference image region by the identifying unit, and
wherein, if the authentication request determining unit has determined that the authentication request is not valid, the authenticating unit determines authentication failure in response to the authentication request.

17. A non-transitory, computer readable storage medium storing a program for causing a computer to function as:
a receiving unit that receives an image region as an authentication target read from a surface of a target object possessed by a user together with an authentication request from the user;
an identifying unit that identifies a position corresponding to the image region as the authentication target and one reference image region corresponding to the image region as the authentication target in a plurality of previously stored reference image regions read from respective surfaces of a plurality of target objects; and
an authenticating unit that executes authentication in response to the authentication request based on the identified position,
wherein the identifying unit identifies a position in the one reference image region corresponding to the image region as the authentication target in the plurality of reference image regions,
wherein the program further causes the computer to function as an authentication request determining unit that determines whether or not the authentication request is valid based on whether or not the identified position in the reference image region is included in a used image region including a position identified in past for the reference image region by the identifying unit, and
wherein, if the authentication request determining unit has determined that the authentication request is not valid, the authenticating unit determines authentication failure in response to the authentication request.

* * * * *